US012695694B2

(12) United States Patent
Papamichael et al.

(10) Patent No.: US 12,695,694 B2
(45) Date of Patent: Jul. 28, 2026

(54) RELIABLE OUT-OF-ORDER TRANSPORT PROTOCOL WITH FAST RETRANSMISSION OF PACKETS

(71) Applicant: Microsoft Technology Licensing, LLC, Redmond, WA (US)

(72) Inventors: Michael Konstantinos Papamichael, Redmond, WA (US); David Andreas Sidler, Seattle, WA (US); Fei Gao, Long Island City, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 239 days.

(21) Appl. No.: 18/210,561

(22) Filed: Jun. 15, 2023

(65) Prior Publication Data

US 2024/0422094 A1     Dec. 19, 2024

(51) Int. Cl.
*H04L 45/00* (2022.01)
*H04L 1/1607* (2023.01)
*H04L 5/00* (2006.01)
(52) U.S. Cl.
CPC ............ *H04L 45/38* (2013.01); *H04L 1/1642* (2013.01); *H04L 5/0053* (2013.01)
(58) Field of Classification Search
CPC ..... H04L 45/38; H04L 1/1642; H04L 5/0053; H04L 1/1825; H04L 1/1809; H04L 2001/0096
See application file for complete search history.

(56) References Cited

U.S. PATENT DOCUMENTS

| 9,621,468 B1 | 4/2017 | Sorenson, III |
| 11,343,198 B2 | 5/2022 | Shalev et al. |
| | (Continued) | |

FOREIGN PATENT DOCUMENTS

| EP | 1105988 | 11/2012 |
| EP | 3487133 | 5/2019 |
| | (Continued) | |

OTHER PUBLICATIONS

International Search Report and Written Opinion dated Sep. 5, 2024, for International Patent Application No. PCT/US2024/033474, 17 pp.

(Continued)

*Primary Examiner* — Yaotang Wang
(74) *Attorney, Agent, or Firm* — Klarquist Sparkman, LLP

(57)     ABSTRACT

As part of managing delivery of a packet flow according to a reliable transport protocol that supports multi-path delivery, a sender splits data into multiple flow packets of a flow and sends at least some of the flow packets to a receiver on multiple paths of a network. The sender receives feedback metadata and updates an out-of-order ("OOO") tracking window. The sender also determines a metric that quantifies degree of OOO delivery. In general, the metric measures the extent to which flow packets have been successfully delivered OOO after a "missing" flow packet. If a sufficient count or range of flow packets have been acknowledged as received OOO after the missing flow packet, the missing flow packet is likely to have been dropped—not merely delayed. Depending on the metric, the sender selectively resends to the receiver one or more unacknowledged flow packets.

20 Claims, 8 Drawing Sheets

(56) References Cited

U.S. PATENT DOCUMENTS

| | | | |
|---|---|---|---|
| 2007/0005787 A1 | 1/2007 | Igarashi et al. | |
| 2007/0064705 A1* | 3/2007 | Tateno | H04L 1/1832 |
| | | | 370/394 |
| 2007/0206615 A1 | 9/2007 | Plamondon et al. | |
| 2010/0241919 A1 | 9/2010 | Jeon | |
| 2012/0226802 A1 | 9/2012 | Wu et al. | |
| 2014/0153574 A1 | 6/2014 | Louzoun et al. | |
| 2014/0254351 A1* | 9/2014 | Newman | H04L 1/1877 |
| | | | 370/228 |
| 2014/0301223 A1* | 10/2014 | Wong | H04L 1/1825 |
| | | | 370/252 |
| 2015/0281026 A1* | 10/2015 | Thapliya | H04L 1/203 |
| | | | 370/252 |
| 2016/0173394 A1 | 6/2016 | Harvell | |
| 2016/0285767 A1 | 9/2016 | Brandeburg et al. | |
| 2018/0167168 A1 | 6/2018 | Shoens et al. | |
| 2021/0203606 A1 | 7/2021 | Burroughs et al. | |
| 2021/0399990 A1 | 12/2021 | Wang et al. | |
| 2022/0046667 A1* | 2/2022 | Sun | H04L 1/1887 |
| 2022/0086100 A1 | 3/2022 | Biederman et al. | |
| 2023/0061794 A1 | 3/2023 | Livne et al. | |

FOREIGN PATENT DOCUMENTS

| | | |
|---|---|---|
| EP | 4099649 | 12/2022 |
| WO | WO 2023/011712 | 2/2023 |

OTHER PUBLICATIONS

International Search Report and Written Opinion dated Sep. 17, 2024, from International Patent Application No. PCT/US2024/033483, 15 pp.

International Search Report and Written Opinion dated Sep. 19, 2024, from International Patent Application No. PCT/US2024/032184, 12 pp.

Kaspar, "Multipath Aggregation of Heterogeneous Access Networks," Ph.D. Dissertation, University of Oslo, 138 pp. (Dec. 2011).

Office Action dated Sep. 10, 2025, from U.S. Appl. No. 18/213,215, 6 pp.

Notice of Allowance dated Feb. 13, 2026, from U.S. Appl. No. 18/213,215, 10 pp.

Office Action dated Feb. 13, 2026, from U.S. Appl. No. 18/210,573, 28 pp.

Communication pursuant to Rules 161(1) and 162 EPC dated Jan. 22, 2026, for European Patent Application No. 24739882.9, 3 pp.

Communication pursuant to Rules 161(1) and 162 EPC dated Jan. 22, 2026, for European Patent Application No. 24737564.5, 3 pp.

Communication pursuant to Rules 161(1) and 162 EPC dated Jan. 29, 2026, for European Patent Application No. 24736930.9, 3 pp.

International Preliminary Report on Patentability dated Dec. 26, 2025, from International Patent Application No. PCT/US2024/033474, 11 pp.

International Preliminary Report on Patentability dated Dec. 26, 2025, from International Patent Application No. PCT/US2024/032184, 6 pp.

International Preliminary Report on Patentability dated Jan. 2, 2026, from International Patent Application No. PCT/US2024/033483, 9 pp.

* cited by examiner logic or software 141 implementing one or more innovations for a reliable OOO transport protocol with fast retransmission of packets

FIG. 2        200
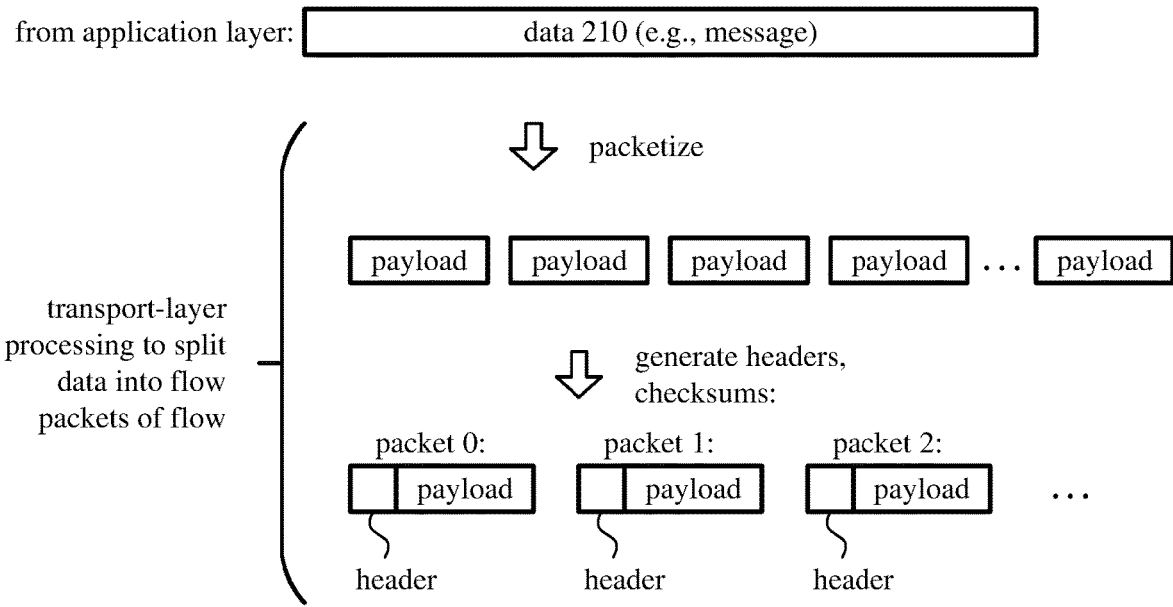
FIG. 3        300
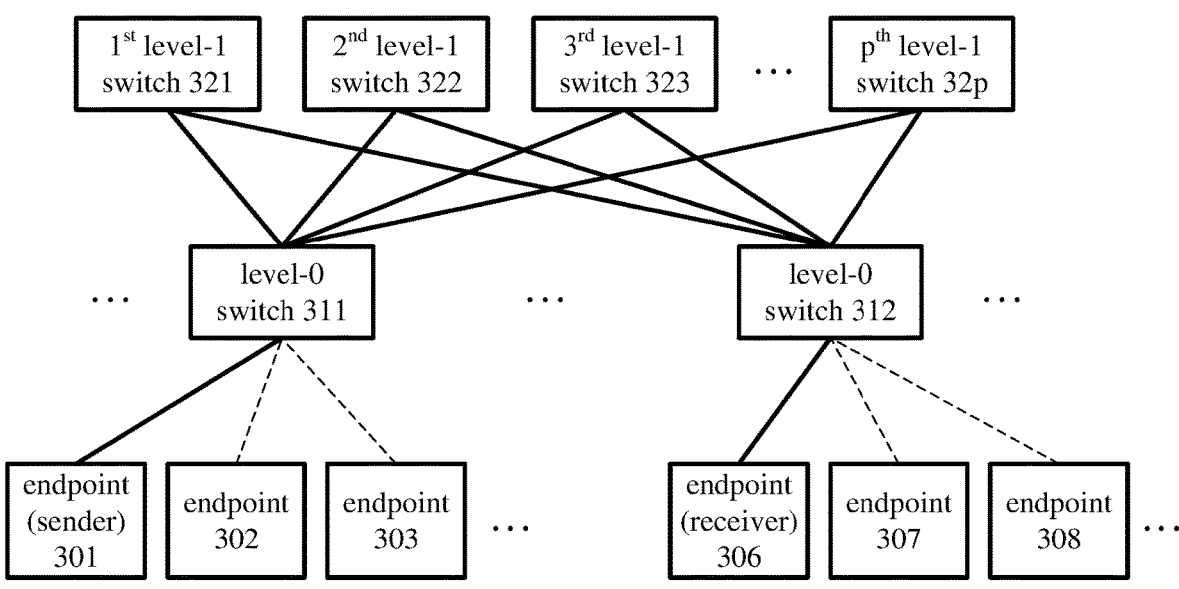

FIG. 4    400
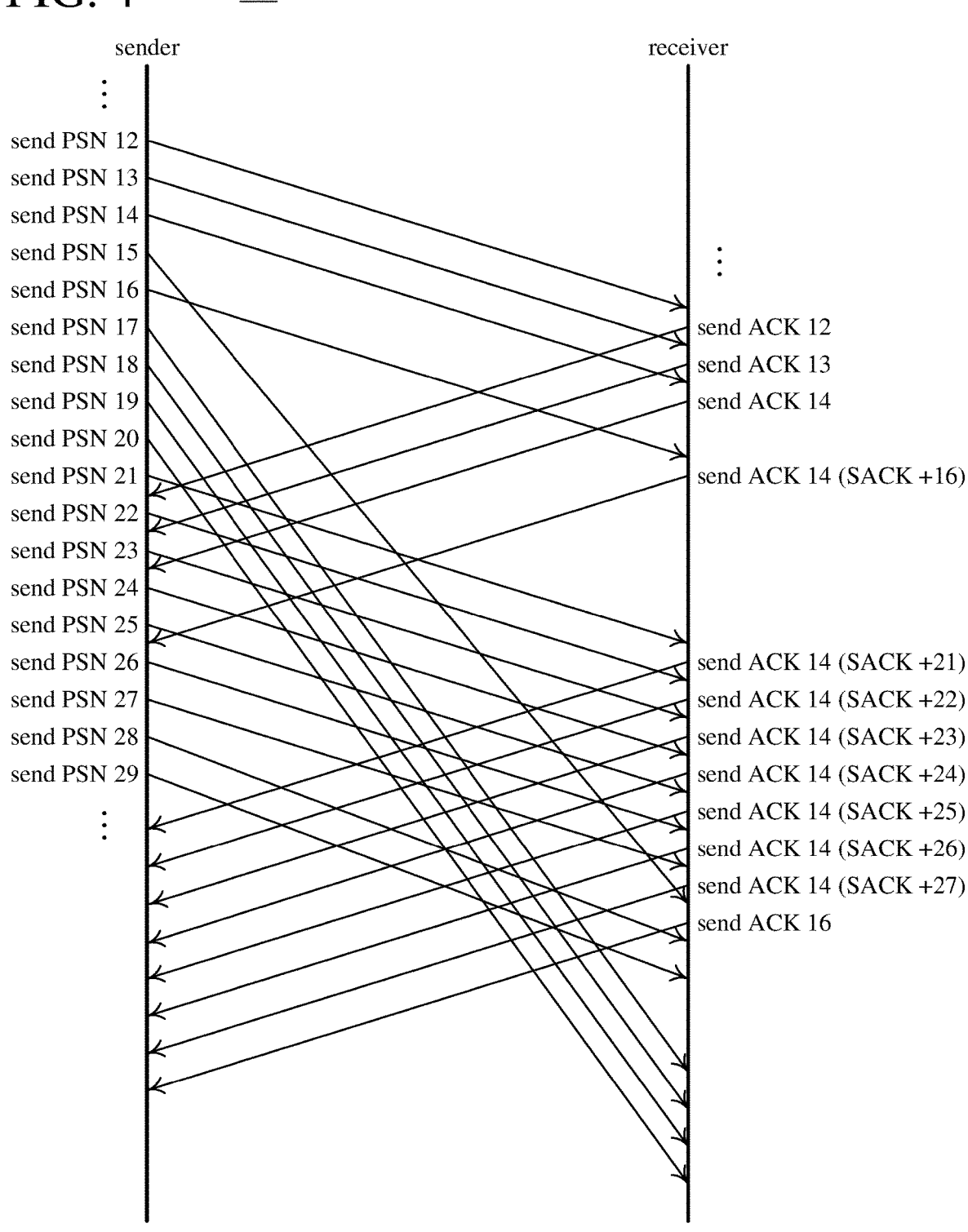

FIG. 6    <u>600</u>
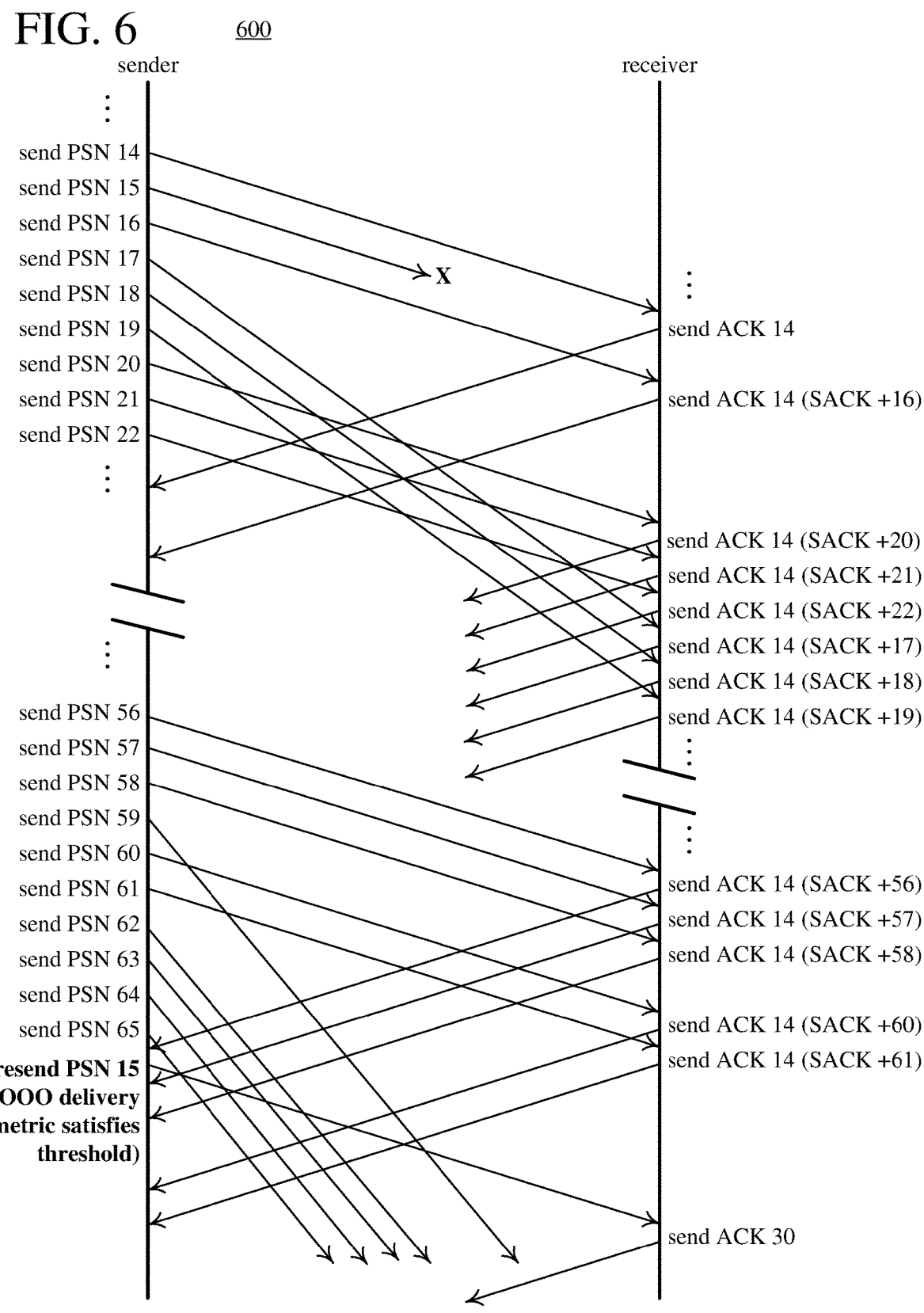

approaches (700) to determining metric that quantifies degree of OOO delivery

OOO tracking window state (710) after sender receives ACK 14 with SACK +56

$1^{st}$ metric (last SACK'd flow packet): 40

$2^{nd}$ metric (count of consecutive SACK'd flow packets at start of OOO tracking window): 15

$3^{rd}$ metric (count of SACK'd flow packets in OOO tracking window): 31 approaches (800) to identifying flow packets to resend

OOO tracking window state (710) after sender receives ACK 14 with SACK +56

1st approach (first in-order unACK'd flow packet):  PSN 15

2nd approach (consecutive unACK'd flow packets at start of OOO tracking window):  PSN 15

3rd approach (all "holes" in OOO tracking window):  PSNs 15, 31, 32, 42-44, 47-51

4th approach (first x% of "holes" in OOO tracking window):  PSNs 15, 31, 32

FIG. 9        900
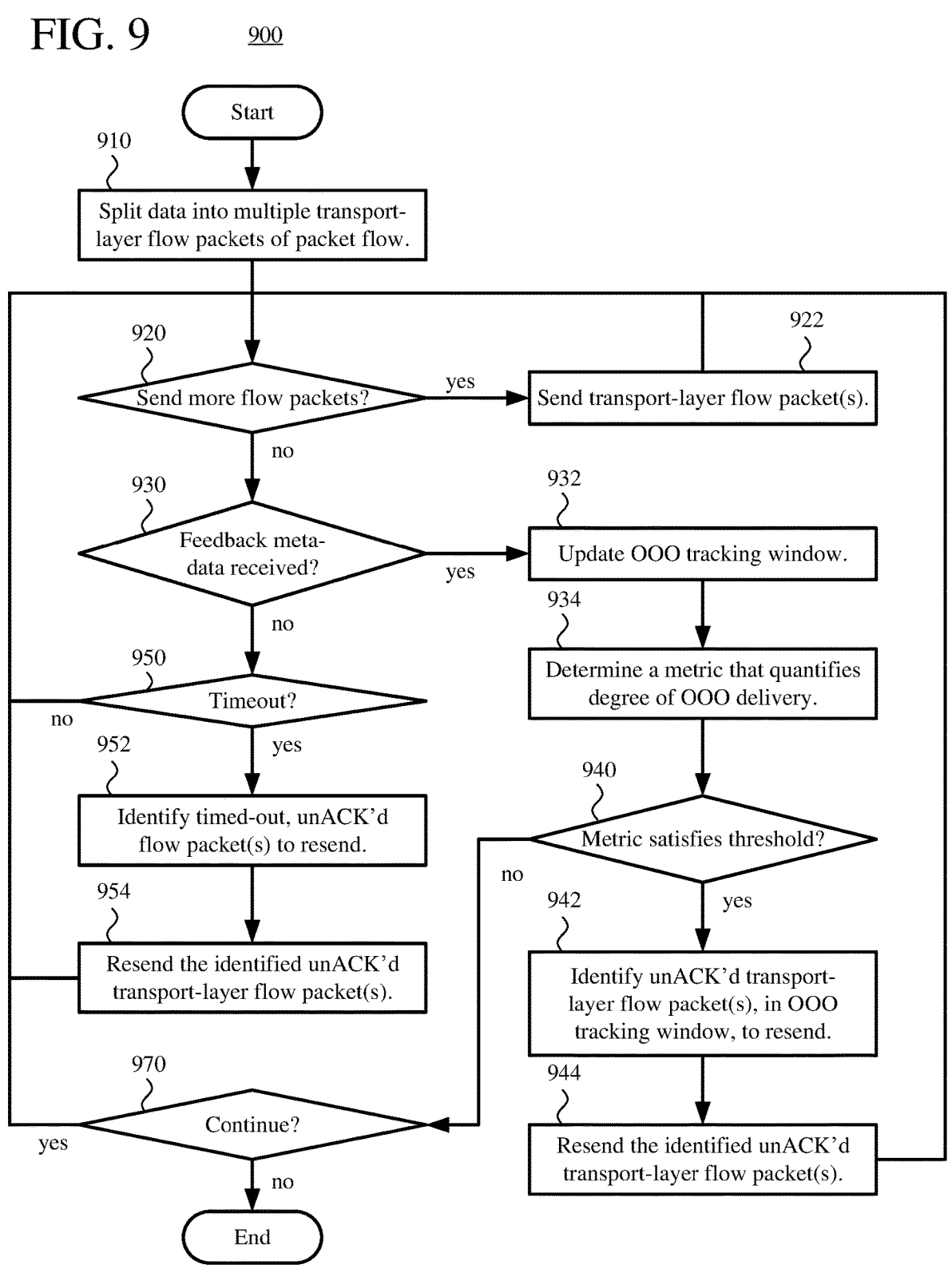

RELIABLE OUT-OF-ORDER TRANSPORT PROTOCOL WITH FAST RETRANSMISSION OF PACKETS

BACKGROUND

In computer networking, a transport protocol is a set of rules and procedures that govern the exchange of data between computing devices over a computer network. Typically, one of the computing devices, acting as a sender, breaks data such as a message or file into smaller units called packets. The sender sends the packets over the computer network to another computing device, which has the role of a receiver and can recreate the data from information in the packets.

A transport protocol interoperates with network protocols at other layers. For example, an implementation of a transport layer receives data such as a message or file from an implementation of an application layer, presentation layer, or session layer. The implementation of the transport layer provides transport-layer packets for the data to an implementation of a network layer, which can implement a version of Internet Protocol ("IP"). Depending on the transport protocol, transport-layer processing can provide features such as error detection, retransmission of dropped transport-layer packets, control over the rate that transport-layer packets are transmitted (sometimes called flow control), and sequencing of transport-layer packets. Transmission control protocol ("TCP") and user datagram protocol ("UDP") are two examples of transport protocols.

A reliable transport protocol uses mechanisms to guarantee, or at least take steps to guarantee, the delivery of transport-layer packets from the sender to the receiver. Such mechanisms can include error detection, retransmission of dropped packets, and flow control. TCP is an example of a reliable transport protocol. The mechanisms that provide for reliable delivery of transport-layer packets can add delay to detect and retransmit dropped packets, which may be significant if many transport-layer packets are dropped. UDP is an example of an unreliable transport protocol. UDP can provide more timely delivery of transport-layer packets, without the overhead of reliability mechanisms but also without the attempts to guarantee delivery.

Some reliable transport protocols support only single-path delivery of transport-layer packets of a flow from a sender to a receiver. For single-path delivery, the packets of the flow are delivered over a single path through a network. In a simple network, there might be only a single path between the sender and the receiver. More commonly, the network has multiple potential paths between the sender and receiver, but routing mechanisms (such as conventional equal cost multi-path ("ECMP") hashing mechanisms) cause packets that belong to the same flow to take the same path. Because the flow packets all travel along the same path, the flow packets are assumed to arrive at the receiver in the same order that the flow packets are sent by the sender.

In contrast, other reliable transport protocols support multi-path delivery of transport-layer packets of a flow from a sender to a receiver. For multi-path delivery, different packets of the flow are delivered over different, alternative paths of a computer network. By delivering packets of a flow on multiple paths of the network, the available bandwidth of the network can be more consistently and evenly used. The amount of delay on different paths can vary, however. For example, a switch may be temporarily busy, causing delay in delivery of packets through that switch. Because of different delays along different paths, packets are frequently received by the receiver in an order different than the order the packets were sent by the sender.

In extreme cases, a packet may be dropped due to congestion at a switch. Rarely, bits of a packet may suffer from bit flips due to interference, an unreliable link, or another cause, resulting in the packet being dropped when loss of information is detected. A sender can retransmit a dropped packet.

Some previous reliable transport protocols provide some support for out-of-order ("OOO") delivery of transport-layer packets over multiple paths of a network. In particular, some previous reliable transport protocols allow for variations in delay in delivery of a transport-layer packet, such that the packet can be delivered OOO so long as the delayed packet is received within a defined window. By waiting to resend a packet, which might have been dropped or might have merely been delayed, the sender provides additional time for the packet to arrive and avoids unnecessary retransmission of the packet. Eventually, however, after a significant delay, the sender can decide that a delayed packet has actually been dropped, and the sender retransmits the dropped packet. In extreme cases, the sender may stall—unable to send new packets—until the dropped packet is retransmitted and acknowledged as received.

In many usage scenarios, previous approaches fail to accurately determine in a timely manner whether packets have been dropped or merely delayed. Approaches that use a timeout condition can accurately indicate whether a packet has been dropped or delayed, but such approaches are slow to react to actual packet drops. On the other hand, approaches that use a faster retransmission condition often make incorrect decisions about whether a packet has been dropped or merely delayed.

SUMMARY

In summary, the detailed description presents innovations in operations of a reliable out-of-order ("OOO") transport protocol with fast retransmission of packets. With the fast retransmission mechanism, a sender can quickly and accurately determine whether a packet is dropped or merely delayed, and quickly resend a dropped packet. This can result in reliable delivery of packets that is faster overall. It can also help the sender avoid situations in which the sender stalls—is unable to send new flow packets-until a dropped packet is retransmitted and acknowledged as received.

For example, as part of managing delivery of a flow according to a reliable transport protocol that supports multi-path delivery, a sender splits data into multiple transport-layer flow packets of a flow. The sender sends at least some of the multiple flow packets, to a receiver, on multiple paths of a network. The sender receives, from the receiver, feedback metadata. The feedback metadata can include acknowledgement ("ACK") metadata in ACK packets as well as selective ACK ("SACK") metadata, such as SACK information in the ACK packets. Based at least in part on the feedback metadata, the sender updates an OOO tracking window. For example, the OOO tracking window starts at an earliest in-order unacknowledged flow packet among the sent transport-layer flow packets but also tracks later flow packets that have been acknowledged as received OOO by the receiver.

The sender determines a metric that quantifies degree of OOO delivery. To determine the metric that quantifies degree of OOO delivery, the sender can use information (such as SACK information) specifying flow packet(s) that have been acknowledged as received OOO by the receiver.

In general, the metric measures the extent to which flow packets have been successfully delivered OOO after a "missing" flow packet. If a sufficient count or range of flow packets have been acknowledged as received OOO after the missing packet, the missing packet is likely to have been dropped—not merely delayed. Depending on implementation, the metric can be determined in different ways. For example, the metric can indicate a difference between the start of the updated OOO tracking window and a last OOO receipt event (that is, the acknowledged flow packet with the highest packet sequence number) in the updated OOO tracking window. Or, as another example, the metric can indicate a count of OOO receipt events in the updated OOO tracking window. The count of OOO receipt events can be the count of acknowledged flow packets in the updated OOO tracking window. Or, alternatively, the count of OOO receipt events can be the count of consecutive acknowledged flow packets at the start of the updated OOO tracking window.

Based at least in part on the metric, the sender selectively resends to the receiver one or more unacknowledged flow packets, according to the updated OOO tracking window, among the sent flow packets. For example, the sender compares the metric to a threshold. If the sender determines that the metric satisfies the threshold, in response the sender resends the unacknowledged flow packet(s) to the receiver. On the other hand, if the sender determines that the metric does not satisfy the threshold, in response the sender skips the resending of the unacknowledged flow packet(s) to the receiver. The unacknowledged flow packet(s) that are retransmitted can be identified according to any of various strategies, depending on implementation.

The threshold can be set depending on the count of multiple paths across which the flow packets are distributed, depending on past behavior for traffic delivered over the network, and/or depending on another factor. The sender can dynamically adjust the threshold based on the location of a last OOO receipt event in the updated OOO tracking window, the current condition of the network, the current workload of the sender, and/or another factor.

Using the metric that quantifies degree of OOO delivery, the sender can accurately and quickly determine whether a packet is dropped or merely delayed, and resend a dropped packet. This can allow the sender to react more quickly to packet drops, making reliable delivery of packets faster overall. It can also help the sender avoid situations in which the sender stalls because the OOO tracking window is unable to move forward in time, but the sender cannot send new flow packets until the earliest packet in the OOO tracking window is acknowledged as received.

The innovations described herein can be implemented as part of a method, as part of a computer system (physical or virtual, as described below) or network interface device configured to perform the method, or as part of a tangible computer-readable media storing computer-executable instructions for causing one or more processors, when programmed thereby, to perform the method. The various innovations can be used in combination or separately. The innovations described herein include the innovations covered by the claims. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations.

FIG. 2 is a diagram of example transport-layer processing in conjunction with which some described embodiments can be implemented.

FIG. 3 is a diagram of an example network in which some described embodiments can be implemented.

FIG. 4 is a listing that illustrates delivery of packets of an example packet sequence (400) over a network.

FIG. 6 is a listing that illustrates delivery of packets of an example packet sequence over a network according to a reliable OOO transport protocol with fast retransmission of packets.

FIG. 9 is a flowchart illustrating a generalized technique for delivery of packets in a network according to a reliable OOO transport protocol with fast retransmission of packets.

DETAILED DESCRIPTION

The detailed description presents innovations in operations of a reliable out-of-order ("OOO") transport protocol with fast retransmission of packets. For example, as part of managing delivery of a flow according to a reliable transport protocol that supports multi-path delivery, a sender splits data into multiple flow packets of a flow and sends at least some of the flow packets, to a receiver, on multiple paths of a network. The sender receives, from the receiver, feedback metadata and updates an OOO tracking window. The sender also determines a metric that quantifies degree of OOO delivery. In general, the metric that quantifies degree of OOO delivery measures the extent to which flow packets have been successfully delivered OOO after a "missing" flow packet, which may have been dropped or may merely be delayed. If a sufficient count or range of flow packets have been acknowledged as received OOO after the missing flow packet, the missing flow packet is likely to have been dropped—not merely delayed. Depending on the metric, the sender selectively resends to the receiver one or more unacknowledged flow packets. In example usage scenarios, the sender can accurately and quickly determine whether a packet is dropped or merely delayed, and resend a dropped packet. This can result in reliable delivery of packets that is faster overall. It can also help the sender avoid situations in which the sender stalls because the OOO tracking window is unable to move forward in time, but the sender cannot send new packets until the earliest packet in the OOO tracking window is acknowledged as received.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique or tool does not solve all such problems. It is to be understood that other examples may be utilized and that structural, logical, soft-ware, hardware, and electrical changes may be made without departing from the scope of the disclosure. The following description is, therefore, not to be taken in a limited sense.

I. Example Computer Systems.

Figure 1:
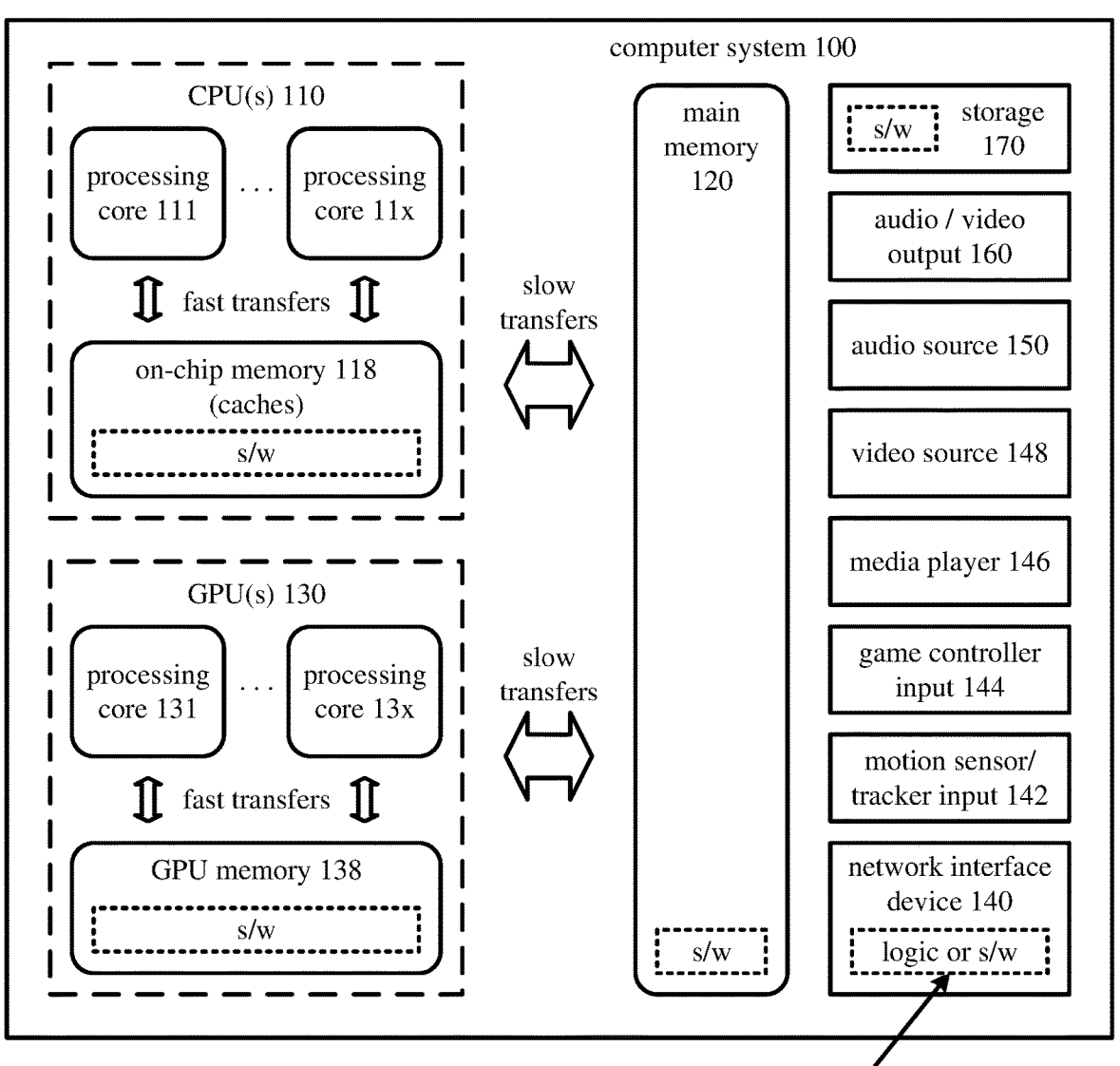
FIG. 1 is a diagram illustrating an example computer system in which some described embodiments can be implemented.

FIG. 1 illustrates a generalized example of a suitable computer system (100) in which several of the described innovations may be implemented. The innovations described herein relate to a reliable out-of-order ("OOO") transport protocol with fast retransmission of flow packets. The computer system (100) is not intended to suggest any limitation as to scope of use or functionality, as the inno-vations may be implemented in diverse computer systems, including special-purpose computer systems.

With reference to FIG. 1, the computer system (100) includes one or more processing cores (110 . . . 11x) and local memory (118) of a central processing unit ("CPU") or multiple CPUs. The processing core(s) (110 . . . 11x) are, for example, processing cores on a single chip, and execute computer-executable instructions. The number of processing core(s) (110 . . . 11x) depends on implementation and can be, for example, 4 or 8. The local memory (118) may be volatile memory (e.g., registers, cache, RAM), non-volatile memory (e.g., ROM, EEPROM, flash memory, etc.), or some com-bination of the two, accessible by the respective processing core(s) (110 . . . 11x). Alternatively, the processing cores (110 . . . 11x) can be part of a system-on-a-chip ("SoC"), application-specific integrated circuit ("ASIC"), or other integrated circuit. In FIG. 1, the local memory (118) is on-chip memory such as one or more caches, for which access operations, transfer operations, etc. with the process-ing core(s) (110 . . . 11x) are fast.

The computer system (100) also includes processing cores (130 . . . 13x) and local memory (138) of a graphics processing unit ("GPU") or multiple GPUs. The number of processing cores (130 . . . 13x) of the GPU depends on implementation. The processing cores (130 . . . 13x) are, for example, part of single-instruction, multiple data ("SIMD") units of the GPU. The SIMD width n, which depends on implementation, indicates the number of elements (some-times called lanes) of a SIMD unit. For example, the number of elements (lanes) of a SIMD unit can be 16, 32, 64, or 128 for an extra-wide SIMD architecture. The GPU memory (138) may be volatile memory (e.g., registers, cache, RAM), non-volatile memory (e.g., ROM, EEPROM, flash memory, etc.), or some combination of the two, accessible by the respective processing cores (130 . . . 13x).

The computer system (100) includes main memory (120), which may be volatile memory (e.g., RAM), non-volatile memory (e.g., ROM, EEPROM, flash memory, etc.), or some combination of the two, accessible by the processing core(s) (110 . . . 11x, 130 . . . 13x). In FIG. 1, the main memory (120) is off-chip memory, for which access operations, transfer operations, etc. with the processing cores (110 . . . 11x, 130 . . . 13x) are slower.

More generally, the term "processor" may refer generi-cally to any device that can process computer-executable instructions and may include a microprocessor, microcon-troller, programmable logic device, digital signal processor, and/or other computational device. A processor may be a processing core of a CPU, other general-purpose unit, or GPU. A processor may also be a specific-purpose processor implemented using, for example, an ASIC or a field-pro-grammable gate array ("FPGA").

The term "control logic" may refer to a controller or, more generally, one or more processors, operable to process computer-executable instructions, determine outcomes, and generate outputs. Depending on implementation, control logic can be implemented by software executable on a CPU, by software controlling special-purpose hardware (e.g., a GPU or other graphics hardware), or by special-purpose hardware (e.g., in an ASIC).

The computer system (100) includes one or more network interface devices (140) such as network interface cards ("NICs"). The network interface device(s) (140) enable communication over a network to another computing entity (e.g., server, other computer system). In some example implementations, the network interface device(s) (140) sup-port wired connections for a network of high-performance computers. In practice, the network may include thousands, tens of thousands, or even more network interface devices. Examples of networks are described below with reference to FIG. 3. Alternatively, the network interface device(s) (140) can support wired connections and/or wireless connections for a wide-area network, local-area network, personal-area network or other network. For example, the network inter-face device(s) can include one or more Wi-Fi transceivers, an Ethernet port, a cellular transceiver and/or another type of network interface device, along with associated drivers, software, etc.

The network interface device(s) (140) implement logic or software (141) for a reliable OOO transport protocol with fast retransmission of flow packets. For example, one of the network interface device(s) (140) is implemented using an FPGA that provides logic for a reliable OOO transport protocol with fast retransmission of flow packets. Alterna-tively, one of the network interface device(s) (140) includes memory that stores software implementing aspects of the reliable OOO transport protocol with fast retransmission of flow packets, in the form of firmware or other computer-executable instructions for an FPGA, ASIC, or other pro-cessor of the network interface device.

The network interface device(s) (140) convey information such as computer-executable instructions, arbitrary data from an application, or other data in a modulated data signal over network connection(s). A modulated data signal is a signal that has one or more of its characteristics set or changed in such a manner as to encode information in the signal. By way of example, the network connections can use an electrical, optical, RF, or other carrier.

The computer system (100) optionally includes a motion sensor/tracker input (142) for a motion sensor/tracker, which can track the movements of a user and objects around the user. For example, the motion sensor/tracker allows a user (e.g., player of a game) to interact with the computer system (100) through a natural user interface using gestures and spoken commands. The motion sensor/tracker can incorpo-rate gesture recognition, facial recognition and/or voice recognition.

The computer system (100) optionally includes a game controller input (144), which accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller.

The computer system (100) optionally includes a media player (146) and video source (148). The media player (146) can play DVDs, Blu-ray discs, other disc media and/or other formats of media. The video source (148) can be a camera input that accepts video input in analog or digital form from a video camera, which captures natural video. Or, the video source (148) can be a screen capture module (e.g., a driver of an operating system, or software that interfaces with an operating system) that provides screen capture content as input. Or, the video source (148) can be a graphics engine that provides texture data for graphics in a computer-represented environment. Or, the video source (148) can be a video card, TV tuner card, or other video input that accepts input video in analog or digital form (e.g., from a cable input, HDMI input or other input).

An optional audio source (150) accepts audio input in analog or digital form from a microphone, which captures audio, or other audio input.

The computer system (100) optionally includes a video output (160), which provides video output to a display device. The video output (160) can be an HDMI output or other type of output. An optional audio output (160) provides audio output to one or more speakers.

The storage (170) may be removable or non-removable, and includes magnetic media (such as magnetic disks, magnetic tapes or cassettes), optical disk media and/or any other media which can be used to store information and which can be accessed within the computer system (100).

The computer system (100) may have additional features. For example, the computer system (100) includes one or more other input devices and/or one or more other output devices. The other input device(s) may be a touch input device such as a keyboard, mouse, pen, or trackball, a scanning device, or another device that provides input to the computer system (100). The other output device(s) may be a printer, CD-writer, or another device that provides output from the computer system (100).

An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The computer system (100) of FIG. 1 is a physical computer system. A virtual machine can include components organized as shown in FIG. 1.

The term "application" or "program" may refer to software such as any user-mode instructions to provide functionality. The software of the application (or program) can further include instructions for an operating system and/or device drivers. The software can be stored in associated memory. The software may be, for example, firmware. While it is contemplated that an appropriately programmed general-purpose computer or computing device may be used to execute such software, it is also contemplated that hard-wired circuitry or custom hardware (e.g., an ASIC) may be used in place of, or in combination with, software instructions. Thus, examples described herein are not limited to any specific combination of hardware and software.

The term "computer-readable medium" refers to any medium that participates in providing data (e.g., instructions) that may be read by a processor and accessed within a computing environment. A computer-readable medium may take many forms, including non-volatile media and volatile media. Non-volatile media include, for example, optical or magnetic disks and other persistent memory. Volatile media include dynamic random access memory ("DRAM"). Common forms of computer-readable media include, for example, a solid state drive, a flash drive, a hard disk, any other magnetic medium, a CD-ROM, DVD, any other optical medium, RAM, programmable read-only memory ("PROM"), erasable programmable read-only memory ("EPROM"), a USB memory stick, any other memory chip or cartridge, or any other medium from which a computer can read. The term "non-transitory computer-readable media" specifically excludes transitory propagating signals, carrier waves, and wave forms or other intangible or transitory media that may nevertheless be readable by a computer. The term "carrier wave" may refer to an electromagnetic wave modulated in amplitude or frequency to convey a signal.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU or special-purpose hardware to provide functionality described herein, instructions executable on processing cores of a GPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or device. In general, a computer system or device can be local or distributed, and can include any combination of special-purpose hardware and/or hardware with software implementing the functionality described herein.

Numerous examples are described in this disclosure, and are presented for illustrative purposes only. The described examples are not, and are not intended to be, limiting in any sense. The presently disclosed innovations are widely applicable to numerous contexts, as is readily apparent from the disclosure. One of ordinary skill in the art will recognize that the disclosed innovations may be practiced with various modifications and alterations, such as structural, logical, software, and electrical modifications. Although particular features of the disclosed innovations may be described with reference to one or more particular examples, it should be understood that such features are not limited to usage in the one or more particular examples with reference to which they are described, unless expressly specified otherwise. The present disclosure is neither a literal description of all examples nor a listing of features of the invention that must be present in all examples.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. The mere usage of the ordinal numbers "first," "second," "third," and so on does not indicate any physical order or location, any ordering in time, or any ranking in importance, quality, or otherwise. In addition, the mere usage of ordinal numbers does not define a numerical limit to the features identified with the ordinal numbers.

When introducing elements, the articles "a," "an," "the," and "said" are intended to mean that there are one or more of the elements. The terms "comprising," "including," and "having" are intended to be inclusive and mean that there may be additional elements other than the listed elements.

When a single device, component, module, or structure is described, multiple devices, components, modules, or structures (whether or not they cooperate) may instead be used in place of the single device, component, module, or structure. Functionality that is described as being possessed by a single device may instead be possessed by multiple devices, whether or not they cooperate. Similarly, where multiple devices, components, modules, or structures are described herein, whether or not they cooperate, a single device, component, module, or structure may instead be used in place of the multiple devices, components, modules, or structures. Functionality that is described as being possessed by multiple devices may instead be possessed by a single device. In general, a computer system or device can be local or distributed, and can include any combination of special-purpose hardware and/or hardware with software implementing the functionality described herein.

Further, the techniques and tools described herein are not limited to the specific examples described herein. Rather, the respective techniques and tools may be utilized independently and separately from other techniques and tools described herein.

Device, components, modules, or structures that are in communication with each other need not be in continuous communication with each other, unless expressly specified otherwise. On the contrary, such devices, components, modules, or structures need only transmit to each other as necessary or desirable, and may actually refrain from exchanging data most of the time. For example, a device in communication with another device via the Internet might not transmit data to the other device for weeks at a time. In addition, devices, components, modules, or structures that are in communication with each other may communicate directly or indirectly through one or more intermediaries.

As used herein, the term "send" denotes any way of conveying information from one device, component, module, or structure to another device, component, module, or structure. The term "receive" denotes any way of getting information at one device, component, module, or structure from another device, component, module, or structure. The devices, components, modules, or structures can be part of the same computer system or different computer systems. Information can be passed by value (e.g., as a parameter of a message or function call) or passed by reference (e.g., in a buffer). Depending on context, information can be communicated directly or be conveyed through one or more intermediate devices, components, modules, or structures.

As used herein, the term "connected" denotes an operable communication link between devices, components, modules, or structures, which can be part of the same computer system or different computer systems. The operable communication link can be a wired or wireless network connection, which can be direct or pass through one or more intermediaries (e.g., of a network).

A description of an example with several features does not imply that all or even any of such features are required. On the contrary, a variety of optional features are described to illustrate the wide variety of possible examples of the innovations described herein. Unless otherwise specified explicitly, no feature is essential or required.

Further, although process steps and stages may be described in a sequential order, such processes may be configured to work in different orders. Description of a specific sequence or order does not necessarily indicate a requirement that the steps/stages be performed in that order. Steps or stages may be performed in any order practical. Further, some steps or stages may be performed simultaneously despite being described or implied as occurring non-simultaneously. Description of a process as including multiple steps or stages does not imply that all, or even any, of the steps or stages are essential or required. Various other examples may omit some or all of the described steps or stages. Unless otherwise specified explicitly, no step or stage is essential or required. Similarly, although a product may be described as including multiple aspects, qualities, or characteristics, that does not mean that all of them are essential or required. Various other examples may omit some or all of the aspects, qualities, or characteristics.

An enumerated list of items does not imply that any or all of the items are mutually exclusive, unless expressly specified otherwise. Likewise, an enumerated list of items does not imply that any or all of the items are comprehensive of any category, unless expressly specified otherwise.

For the sake of presentation, the detailed description uses terms like "determine" and "select" to describe computer operations in a computer system. These terms denote operations performed by one or more processors or other components in the computer system, and should not be confused with acts performed by a human being. The actual computer operations corresponding to these terms vary depending on implementation.

II. Example Reliable OOO Transport Protocols.

Innovations described herein relate to a reliable out-of-order ("OOO") transport protocol. In general, a transport protocol is a set of rules and procedures that govern the exchange of data between computing devices over a computer network. Typically, a sender breaks data such as a message or file into smaller units called packets. The sender sends the packets over the computer network to a receiver, which can recreate the data from information in the packets. As used herein, the terms "sender" and "receiver" indicate roles for transmission and reception, respectively, of packets for a flow. Depending on the transport protocol, the receiver may send feedback (e.g., as acknowledgement packets) to the sender. Also, in many cases, a computing device acts as a sender for one packet flow and as a receiver for a different packet flow.

A transport protocol interoperates with network protocols at other layers. For example, an implementation of a transport layer (transport-layer implementation or transport-layer processing) receives data such as a message or file from an implementation of an application layer, presentation layer, or session layer. The transport-layer processing provides transport-layer packets for the data to an implementation of a network layer such as a variation of Internet Protocol ("IP"). Depending on the transport protocol, transport-layer processing can provide features such as error detection, retransmission of dropped transport-layer packets, control over the rate that transport-layer packets are transmitted (sometimes called flow control), and sequencing of transport-layer packets. Transmission control protocol ("TCP") and user datagram protocol ("UDP") are two examples of transport protocols.

A reliable transport protocol uses mechanisms to guarantee, or at least take steps to guarantee, the delivery of transport-layer packets from the sender to the receiver. Such mechanisms can include error detection, retransmission of dropped packets, and flow control. TCP is an example of a reliable transport protocol. The mechanisms that provide for reliable delivery of transport-layer packets can add delay to detect and retransmit dropped packets, which may be significant if many transport-layer packets are dropped. UDP is an example of an unreliable transport protocol. It can provide more timely delivery of transport-layer packets, without the overhead of reliability mechanisms but also without the operations to guarantee delivery.

In some example implementations, transport-layer processing implements a lightweight, reliable, message-based transport protocol. The transport-layer processing adds reliability mechanisms, as described herein, on top of UDP and uses IP routing. Alternatively, innovations described herein can be used in conjunction with another reliable transport protocol.

FIG. 2 shows example transport-layer processing (200) in conjunction with which some described embodiments can be implemented. An application-layer entity provides data (210) such as a message or file to a sender for transport-layer processing. In some example implementations, the data (210) is a remote direct memory access ("RDMA") message, for which data is delivered directly into memory of the receiver upon receipt. An address offset in memory can be included in the payload or header. Alternatively, the data (210) is another type of data.

At the sender, transport-layer processing splits the data (210) into transport-layer flow packets of a flow. In particular, the transport-layer processing packetizes the data (210) into multiple payloads for flow packets of a flow. The payloads can have a uniform size, as shown in FIG. 2, or different sizes. The transport-layer processing generates headers for the respective packets, which are ordered by packet sequence number ("PSN") in a packet sequence. A given transport-layer packet includes a header followed by one of the payloads. The header can include various fields. Typically, the header includes fields that indicate a source port of the sender, a destination port of the receiver, a PSN, and a length of the header or the entire transport-layer packet, depending on the protocol. One or more flag bits (also called control bits) of the header can indicate the type of the packet or attributes of the packet. Typically, the header also includes a checksum for the transport-layer packet. The checksum can be computed by applying a checksum function (e.g., XOR, one's complement sum, or hash function) to the data subjected to the checksum, which may include the header, the payload, and other header information (e.g., for IP routing). A receiver can use the checksum to detect errors introduced in transmission.

The sender transmits the respective packets of the flow over a network to the receiver. In typical configurations, traffic for the flow is bursty—there can be intensive traffic for the flow over a short period of time, followed by a long period time with no traffic for the flow. To transmit a burst of flow packets for the flow, the sender can transmit the packets, one after another, with the start of a given packet being separated from the start of a next packet by an inter-packet spacing value (also called an inter-packet gap). The inter-packet spacing value need not be exactly the same between all flow packets of the burst but is typically less than the RTT expected for a flow packet. A burst may be followed by an idle interval, which is typically longer than a timeout condition for the flow packets.

III. Example Networks.

FIG. 3 shows an example network (300) in which some described embodiments can be implemented. The example network (300) includes multiple endpoints (301 . . . 308) and multiple network switches (311, 312, 321 . . . 32p). The network switches are hierarchically organized as level-0 switches (311, 312) and level-1 switches (321 . . . 32p). Each of the level-0 switches (311, 312) connects through dedicated links to some of the respective endpoints (301 . . . 308). The dedicated links between the level-0 (311, 312) switches and the endpoints (301 . . . 308) are, for example, high-speed, high-bandwidth wired connections. Each level-0 switch (311, 312) can be connected to 4, 8, 16, or some other number of endpoints. Each level-0 switch (311, 312) also connects through a dedicated link to each level-1 switch (321 . . . 32p). The network (300) can include 8, 16, 32, or some other number of level-1 switches (321 . . . 32p). For example, the first level-0 switch (311) has a first dedicated link to the first level-1 switch (321), a second dedicated link to the second level-1 switch (322), a third dedicated link to the third level-1 switch (323), and so on. The dedicated links between the level-0 (311, 312) switches and the level-1 switches (321 . . . 32p) are, for example, high-speed, high-bandwidth wired connections.

In FIG. 3, one of the endpoints (301) has the role of sender for a packet flow, and another endpoint (306) has the role of receiver for the packet flow. In practice, each of the endpoints (301 . . . 308) can act as both a receiver and a sender through a network interface device at that endpoint.

The example network (300) is used for multi-path delivery of packets. Transport-layer packets of a flow from a given sender, which may be encapsulated as IP packets, travel across any and all of multiple paths through the network (300) to reach a given receiver. For example, transport-layer packets of a flow from the sender at one endpoint (301) travel across p different paths to the receiver at another endpoint (306). The transport-layer packets pass through the first level-0 switch (311), which distributes the transport-layer packets across the p different level-1 switches (321 . . . 32p) for the p different paths, and through the second level-0 switch (312) to reach the receiver at the other endpoint (306). The transport-layer packets can be routed along different paths through the network (300), for example, by adjusting bits of the destination port field in the headers of the respective packet. The header bits for the destination port field in the header of a given packet can control which path is used for the given packet. The header bits for the respective packets can be adjusted according to results from a hash function, so as to cause different packets to "spray" across the different paths. Or, the header bits can be rotated according to a pattern, so as to cause the packets to be routed on different paths according to the pattern. Traffic between any given combination of sender and receiver can be bursty—there can be intensive traffic for a short period of time, followed by a long period time with of no traffic. By delivering transport-layer packets of a flow along multiple paths of the network (300), the available bandwidth of the network (300) can be more consistently and evenly used.

In some example implementations, the paths in the network (300) are symmetric. The paths have the same length in terms of number of hops through the network (300), the same latency, and the same throughput, at least for paths between endpoints connected to different level-0 switches. Alternatively, the paths in the network (300) are asymmetric. That is, the paths through the network (300) can have different lengths in terms of different numbers of hops through the network (300), different latency, and/or different throughput.

Even in a network with symmetric paths used for multipath delivery, the amount of delay on different paths can vary. A switch may be temporarily busy, causing delay in delivery of packets through that switch. Because of different delays along different paths, packets can be received by a receiver in an order different than the order the packets were sent by a sender. In extreme cases, a packet may be dropped due to congestion at a switch. Rarely, bits of a packet may suffer from bit flips due to interference, an unreliable link, or another cause, resulting in the packet being dropped when loss of information is detected.

In some example implementations, a sender and receiver coordinate to support out-of-order ("OOO") delivery of transport-layer packets of a flow through the multiple paths of the network (300). In general, for OOO delivery, transport-layer packets can be accepted by a receiver even when those packets are received in an order different than the order the packets were sent by a sender. As described in the next section, an OOO tracking window can be updated as transport-layer packets to indicate which packets have been received, which permits a delayed packet to be accepted so long as the delayed packet is received within a range defined by the OOO tracking window. Support for OOO delivery can allow for efficient utilization of multiple paths through the network (300), despite different delays on different paths, so as to balance traffic across the multiple paths.

Many of the innovations described herein are adapted for use in conjunction with multi-path delivery of packets over a network. Alternatively, innovations described herein can be used in conjunction with single-path delivery of packets over a network, in which all transport-layer packets of a flow are delivered along a single path between a sender and a receiver.

IV. Example Reliability Mechanisms for a Transport Protocol.

This section describes various reliability mechanisms that can be used in an implementation of a reliable transport protocol. Some of the reliability mechanisms work well when used with single-path delivery but are ineffective when used with multi-path delivery.

For single-path delivery of packets, packets of a flow from a sender to a receiver are delivered over the same path through a network. Typically, the network has multiple potential paths between the sender and receiver, but routing mechanisms cause packets that belong to the same flow to take the same path. Because the flow packets all travel along the same path, the flow packets are assumed to arrive in the same order that the flow packets are sent. Typically, transport-layer processing that supports single-path delivery implements a variant of "Go-Back-N ARQ" protocol (where ARQ stands for automatic repeat request), which can leverage the assumption of in-order arrival to detect packet loss and notify the sender for recovery.

In some implementations of a reliable transport protocol, the receiver sends an acknowledgement ("ACK") packet when each flow packet from the sender is received. The sender can be implicitly notified about a dropped flow packet through repeated ACKs for the same flow packet. In some reliable transport protocols, an ACK packet indicates the last in-order packet of a flow that has been received by the receiver. For example, suppose the flow packet with PSN 12 is the next flow packet that is expected in order. When the receiver receives a flow packet with PSN 12, the receiver sends an ACK packet (ACK 12) indicating the flow packet with PSN 12 has been received. If the receiver next receives a flow packet with PSN 14, but the flow packet with PSN 13 is the next flow packet that is expected in order, the receiver sends an ACK packet (ACK 12) indicating the flow packet with PSN 12 was the last in-order flow packet received. No representation is made about flow packets with PSNs 14, 15, etc.

When the sender gets the repeated ACK packet (ACK 12), the sender can decide that the flow packet with PSN 13 was dropped. In particular, in some transport protocols, a sender can decide that a given flow packet has been dropped after receiving a threshold count of repeated ACK packets for the given flow packet. The threshold count for repeated ACK packets can be set to a relatively low number (such as 3) for single-path delivery of flow packets, for which in-order delivery is expected. As a fallback retransmission mechanism, a timeout condition can trigger retransmission if the threshold count of repeated ACK packets is never received. After deciding that the flow packet with PSN 13 has been dropped, the sender can react by retransmitting flow packets starting from the flow packet with PSN 13. Unfortunately, subsequent flow packets such as flow packets with PSNs 14, 15, etc. are also retransmitted, even if the receiver correctly received them.

In other implementations of a reliable transport protocol, a receiver sends a negative ACK ("NACK") packet when the receiver determines that an expected flow packet has been dropped. Thus, the sender can be explicitly notified through a NACK packet when the expected flow packet is not received. For example, when the receiver determines that a flow packet with PSN 13 has been dropped, the receiver sends a NACK packet (NACK 13) indicating the flow packet with PSN 13 has not been received. When it gets the NACK packet (NACK 13), the sender can react by retransmitting the flow packet with PSN 13. Unfortunately, subsequent flow packets such as flow packets with PSNs 14, 15, etc. are also retransmitted, even if the receiver correctly received them.

For several reasons, a Go-Back-N ARQ protocol is ineffective for multi-path delivery in which many flow packets are delivered OOO. First, effective throughput tends to decrease significantly as packet drops increase. Because a receiver enforces in-order delivery through ACK packets or NACK packets, flow packets that are delivered OOO but otherwise received successfully are discarded. Discarding of OOO-delivered flow packets can occur so frequently that goodput (that is, useful throughput excluding retransmission overhead) is significantly reduced. Second, at least for implementations that use ACK packets, when many flow packets are delivered OOO due to differential delay amounts in multi-path delivery, it can be difficult to set a threshold count for repeated ACK packets that triggers retransmission at appropriate times. When the receiver receives an OOO flow packet, the receiver cannot know whether the expected in-order flow packet has been dropped or merely delayed. The sender may receive a large number of repeated ACK packets for an in-order flow packet that is merely delayed, not dropped. Picking a suitable threshold count for repeated ACK packets is further complicated by the sender receiving ACK packets OOO and by occasional bursts of packet delays and/or packet drops (a threshold count that works well during normal operations may be too low when there is burst of packet delays and/or packet drops).

To avoid unnecessary retransmission of duplicate/redundant flow packets that can occur in a Go-Back-N ARQ protocol, transport-layer processing can instead use a variant of selective repeat ARQ ("SR-ARQ") approach. The receiver can send selective ACK ("SACK") information along with an ACK packet. Although the ACK packet still indicates the last in-order flow packet received, the SACK information can indicate subsequent flow packets that have been received OOO. In some transport protocols, the SACK information is an n-bit vector (bit mask) with a bit for each of n different flow packets in an OOO tracking window. For example, n is 128 or 256. Larger values of n for the size of the OOO tracking window can significantly increase design area and complexity. For a given flow packet in the OOO tracking window that is associated with a position in the n-bit vector, a first value (such as 0) indicates the given flow packet has not been received, while a second value (such as 1) indicates the given flow packet has been received. Bits of the n-bit vector are updated as flow packets are received OOO. When an in-order flow packet is received, the OOO tracking window slides forward so that the OOO tracking window starts at the next in-order flow packet to be received, whose status is implied to be "not received."

For example, suppose the flow packet with PSN 18 is the next flow packet that is expected in order. When the receiver receives a flow packet with PSN 19, the receiver sends an ACK packet (ACK 17) indicating the flow packet with PSN 17 was the last in-order flow packet received. SACK information associated with the ACK packet also indicates, however, that the flow packet with PSN 19 was successfully received. When the receiver receives a flow packet with PSN 20, the receiver sends another ACK packet (ACK 17) with updated SACK information. The ACK packet (ACK 17) still indicates the flow packet with PSN 17 was the last in-order flow packet received, but the SACK information now indicates that the flow packet with PSN 20 was successfully received.

By using SACK information, a limited number of flow packets can be received OOO. This can improve performance in terms of goodput even for single-path delivery-if flow packets are delivered OOO but within the OOO tracking window, only dropped flow packets are retransmitted. Delayed packets that are delivered OOO need not be retransmitted. In terms of delay for single-path delivery, a sender can retransmit a dropped flow packet after a timeout condition is satisfied for the flow packet. Or, in some transport protocols, a sender can more quickly decide that a given flow packet has been dropped after receiving a threshold count of repeated ACK packets for the given flow packet. The threshold count for repeated ACK packets can be set to a relatively low number (such as 3) for single-path delivery, for which in-order delivery is expected for flow packets and for ACK packets.

Previous implementations of SR-ARQ approaches tend to be ineffective for a multi-path delivery in which many flow packets are delivered OOO. When many flow packets are delivered OOO, it can be difficult to set a threshold count for repeated ACK packets that triggers retransmission at appropriate times, as noted above.

Figures 5A, 5B, 5C:
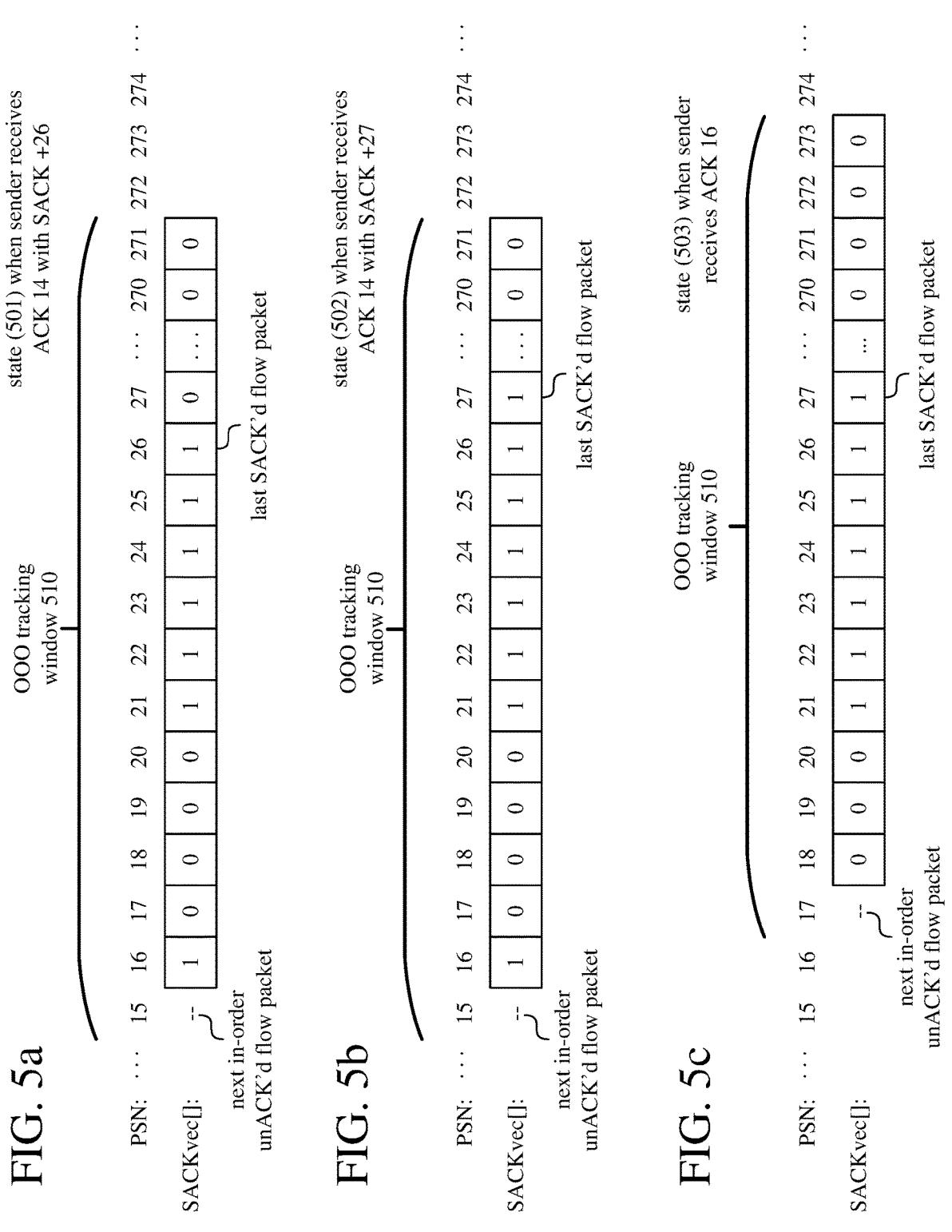
FIGS. 5a-5c are diagrams showing states of an example OOO tracking window at three different times for the example packet sequence of FIG. 4.

FIG. 4 shows delivery of packets of an example packet sequence (400) over multiple paths of a network with multi-path delivery. FIGS. 5a to 5c show states (501, 502, 503) of an example OOO tracking window (510) at three different times for the example packet sequence (400).

With reference to FIG. 4, the sender sends transport-layer packets of a flow (flow packets) in a packet sequence (400) over multiple paths of a network to a receiver. FIG. 4 shows transmission of flow packets from a packet with PSN 12 to a packet with PSN 29. Transmission of other flow packets is not shown. The flow packets with PSNs 12 to 14 are delivered promptly, and the receiver sends ACK packets (ACK 12, ACK 13, ACK 14) for the respective flow packets after they are received. The sender also sends the flow packets with PSNs 15 and 16, but the flow packet with PSN 15 is delayed. When the receiver receives the flow packet with PSN 16, the receiver sends an ACK packet (ACK 14), which indicates the flow packet with PSN 14 was the last in-order flow packet received. The ACK packet includes SACK information that indicates the flow packet with PSN 16 has been received.

The sender sends the flow packets with PSNs 17 to 29, but the flow packets with PSNs 17 to 20 are significantly delayed. When the receiver receives the flow packet with PSN 21, the receiver sends an ACK packet (ACK 14), which indicates the flow packet with PSN 14 is still the last in-order flow packet received, along with SACK information that indicates the flow packet with PSN 21 has been received. The receiver similarly sends ACK packets (ACK 14) and updated SACK information when the flow packets with PSNs 22 to 27 are received.

FIG. 5a shows the state (501) of an OOO tracking window (510) at the sender after the sender has received the ACK packet (ACK 14) and SACK information indicating the flow packet with PSN 26 was received. The OOO tracking window (510) starts after the last in-order flow packet that was received, which was the flow packet with PSN 14. The status of the next in-order flow packet, which is the flow packet with PSN 15, is implied to be "not received" by the start of the OOO tracking window (510). After that, the OOO tracking window (510) has indicator bits updated to match a 256-bit SACK vector SACKvec[ ], which includes an indicator bit for each of the next 256 flow packets in the packet sequence. For the SACK vector, SACKvec[i] is the indicator bit for the flow packet with PSN equal to next_in_order_PSN+i+1, where next_in_order_PSN is the PSN of the next in-order flow packet to be received, for i between 0 and 255 inclusive. In the state (501) shown in FIG. 5a, based on the SACK information in previously received ACK packets, the status is "received" (shown as 1 for the respective indicator bits) for the flow packets with PSN 16 and PSNs 21 to 26, which have been acknowledged as received. The last selectively acknowledged flow packet is the flow packet with PSN 26. The status is still "not received" (shown as 0 for the respective indicator bits) for the remaining flow packets in the OOO tracking window (510), including the delayed flow packets with PSNs 17 to 20.

FIG. 5b shows the state (502) of the OOO tracking window (510) at the sender after the sender has received the ACK packet (ACK 14) and SACK information indicating the flow packet with PSN 27 was received. The OOO tracking window (510) has not moved forward in time. The OOO tracking window (510) still starts after the last in-order flow packet that was received, which was the flow packet with PSN 14. The status of the next in-order flow packet, which is the flow packet with PSN 15, is still implied to be "not received." In the SACK vector, the status for the flow packet with PSN 27 is now "received" (shown as 1 for the indicator bit). The last selectively acknowledged flow packet is the flow packet with PSN 27. Otherwise, the indicator bits of the OOO tracking window (510), which match the SACK vector, are unchanged.

FIG. 5c shows the state (503) of the OOO tracking window (510) at the sender after the sender has received the ACK packet (ACK 16), which indicates the delayed flow packet with PSN 15 has been received. Since the flow packet with PSN 16 has already been acknowledged as received, the OOO tracking window (510) slides forward two positions. The OOO tracking window (510) starts after the last in-order flow packet that was received, which is now the flow packet with PSN 16. The status of the next in-order flow packet, which is the flow packet with PSN 17, is implied to be "not received" by the start of the OOO tracking window (510). The indicator bits from the SACK vector for the flow packets from PSNs 18 to 271 are shifted to the new start of the OOO tracking window (510) but otherwise unchanged. After them, the OOO tracking window (510) and SACK vector include an indicator bit for each new flow packet in the OOO tracking window (510). Indicator bits at positions for the flow packets with PSN 272 and PSN 273 indicate the status of those flow packets is "not received" (shown as 0 for the respective indicator bits).

In some approaches to retransmission of dropped packets, a timeout condition can be evaluated to determine whether to retransmit a flow packet. If an ACK packet is not received for the next in-order flow packet before a timeout timer expires, the sender retransmits the next in-order flow packet. Typically, the timeout timer is set to a relatively high value, so as to provide time for packets to be delivered OOO and acknowledged without retransmission. As a consequence of the long timeout timer, retransmission decisions tend to be slow, which can add delay before a packet flow is completely delivered. In some cases, the long timeout timer may even lead to more frequent instances of the sender stalling because the OOO tracking window cannot slide forward in time. For example, when the timeout timer expires, the last OOO receipt event (the acknowledged flow packet having the highest PSN) may be near the middle or even close to the end of the OOO tracking window before the first attempted retransmission of the flow packet at the start of the OOO tracking window. As a result, the sender may stall before receipt of the flow packet at the start of the OOO tracking window is acknowledged. (The sender will not send flow packets that are outside the end of the OOO tracking window because such flow packets could not be acknowledged as received in SACK information.)

In other approaches to retransmission of dropped packets, a threshold count for repeated ACK packets can be used to determine whether to retransmit a flow packet. Setting a value for the threshold count that is too low can easily result in retransmission of flow packets that are merely delayed, not dropped. For the example shown in FIG. 4, if the threshold count were to be set to 3, the packet with PSN 15 would be retransmitted without giving sufficient time for the original flow packet to arrive. Similarly, retransmissions might happen for the flow packets with PSNs 17 to 20. A low value for a threshold count for repeated ACK packets can provide insufficient time for OOO delivery of packets and lead to inefficient, redundant transmissions of flow packets.

On the other hand, setting a value for the threshold count of repeated ACK packets that is too high allows more time for OOO delivery of packets, but may result in retransmission decisions that are slow, and may even lead to more frequent instances of the sender stalling because the OOO tracking window cannot slide forward in time. For example, if the threshold count of repeated ACK packets is set to 100, by the time the threshold count is reached, the last OOO receipt event (the acknowledged flow packet having the highest PSN) may be near the middle or even close to the end of the OOO tracking window before the first attempted retransmission of the flow packet at the start of the OOO tracking window. As a result, the sender may stall before receipt of the flow packet at the start of the OOO tracking window is acknowledged.

Tuning the value for the threshold count of repeated ACK packets is complicated by several factors. First, like flow packets, ACK packets may be received OOO. Second, in many configurations with multi-path delivery, packet delays and packet drops can be bursty. A threshold count of repeated ACK packets that works well in periods of relatively stable packet delivery may be too low when bursts of packet delays are encountered. A threshold count for repeated ACK packets tends to difficult to tune and not effective for bursts of packet delays and/or packet drops.

V. Reliable OOO Transport Protocols with Fast Retransmission of Flow Packets.

This section describes innovations in operations of a reliable out-of-order ("OOO") transport protocol with fast retransmission of packets. The reliable OOO transport protocol supports multi-path delivery in which flow packets can be received OOO.

For the reliable OOO transport protocol, a sender uses multiple paths across a network to deliver transport-layer packets of a flow (flow packets) to a receiver. In this way, the available bandwidth of the network can be used more effectively. Flow packets delivered on different paths can have different latency, however, due to causes such as temporary congestion at a network switch for one of the paths. Differences in delivery latency can in turn cause flow packets to be received OOO, compared to the order the flow packets were sent. To account for OOO delivery, the receiver can accept a flow packet if the PSN of the flow packet is within an acceptable range defined by an OOO tracking window, which is updated as flow packets are acknowledged as received. The OOO tracking window also tracks missing flow packets, which could be missing due to packet drops or delays.

According to innovations described herein, a fast retransmit mechanism can leverage sender-side state to determine a metric that quantifies degree of OOO delivery. Before the metric reaches a threshold, a missing packet is likely delayed. When the metric reaches the threshold, however, a packet drop has likely occurred. In example usage scenarios, a sender can use the metric to quickly detect packet loss and opportunistically trigger packet retransmission. Packet loss can be detected earlier than with a typical timeout-based mechanism and more precisely than approaches that use a threshold count of repeated ACK packets.

FIG. 6 shows delivery of packets of an example packet sequence (600) over a network according to a reliable OOO transport protocol with fast retransmission of packets. The transport protocol supports multi-path delivery. In the example of FIG. 6, the sender sends transport-layer packets of a flow over multiple paths of a network to a receiver. FIG. 6 shows transmission of flow packets from a packet with PSN 14 to a packet with PSN 65. Transmission of other flow packets is not shown. The flow packet with PSN 14 is delivered promptly, and the receiver sends an ACK packet (ACK 14) for the flow packet after it is received. The sender also sends the flow packets with PSN 15 and PSN 16, but the flow packet with PSN 15 is dropped. When the receiver receives the flow packet with PSN 16, the receiver sends an ACK packet (ACK 14), which indicates the flow packet with PSN 14 was the last in-order flow packet received. The ACK packet includes SACK information that indicates the flow packet with PSN 16 has been received. The sender also sends the flow packets with PSNs 17 to 22. The flow packets with PSNs 17 to 19 are slightly delayed. In any case, the receiver sends ACK packets (ACK 14) and updated SACK information when the flow packets with PSNs 17 to 22 are received.

Figure 7:
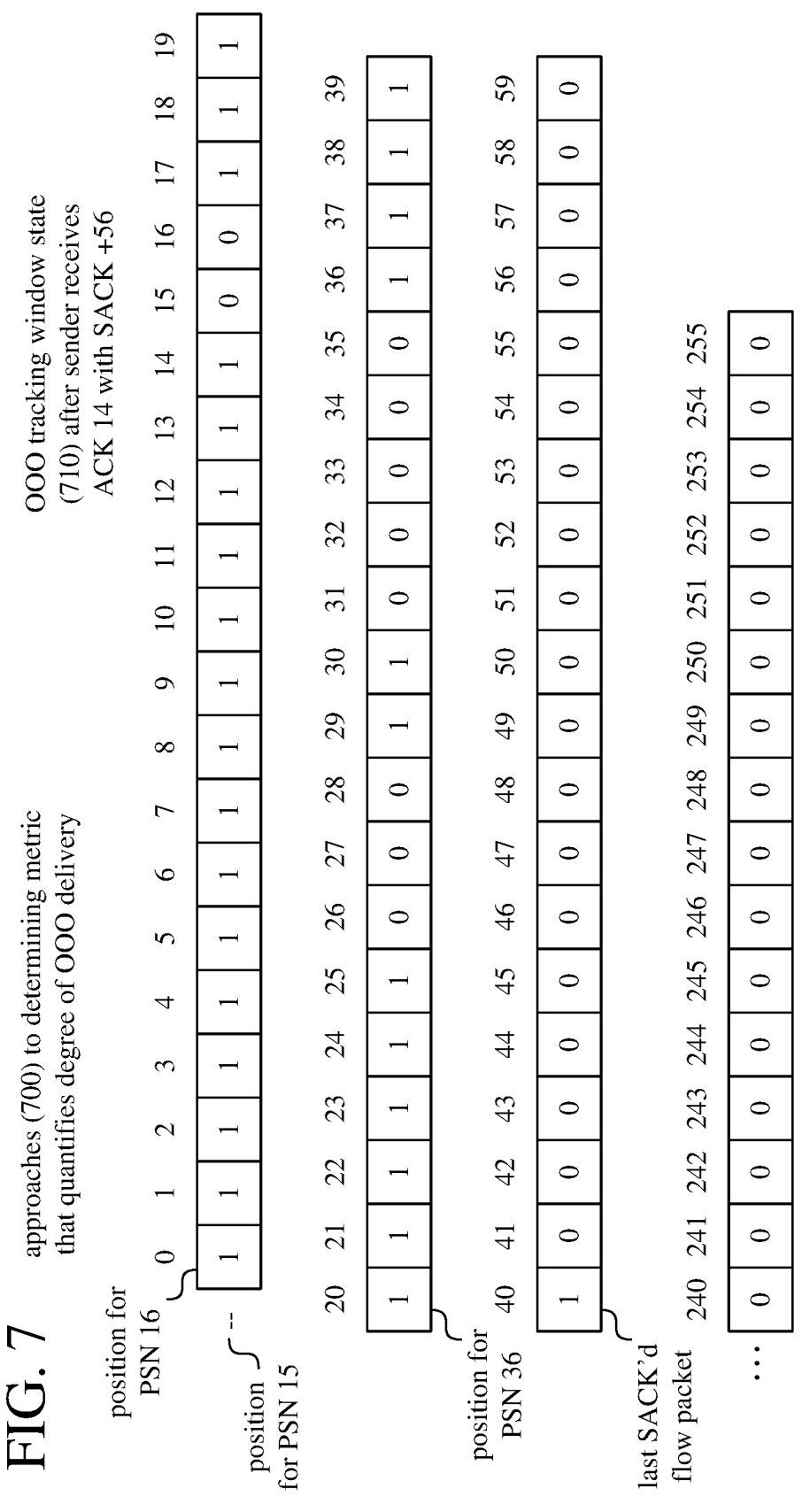
FIG. 7 is a diagram that illustrates different approaches to determining a metric that quantifies degree of OOO delivery according to a reliable OOO transport protocol with fast retransmission of packets.

FIG. 6 does not show transmission of flow packets with PSNs 23 to 55. Some of these flow packets are received by the receiver and acknowledged, while others are delayed or potentially dropped, as shown in FIG. 7. Finally, the sender sends flow packets with PSNs 56 to 65. The receiver sends ACK packets (ACK 14) and updated SACK information when the flow packets with PSNs 56 to 58, 60, and 61 are received. The flow packets with PSNs 59 and 62 to 65 are delayed.

As the sender receives ACK packets and updated SACK information, the sender updates an OOO tracking window that the sender maintains. The sender also determines a metric that quantifies degree of OOO delivery, accounting for the latest SACK information. In the example of FIG. 6, after the sender receives the ACK packet for the flow packet with PSN 56, the sender determines the metric that quantifies degree of OOO delivery, determines that the metric satisfies a threshold for fast retransmission, and resends the earliest unacknowledged flow packet in the OOO tracking window, which is the flow packet with PSN 15.

FIG. 7 shows the state (710) of the OOO tracking window after the sender receives the ACK packet for the flow packet with PSN 56. At this point, the OOO tracking window starts with the next in-order unacknowledged flow packet, which is the flow packet with PSN 15. The OOO tracking window includes indicator bits that have been updated to match SACK information that accompanies the ACK packet. The indicator bits at positions 0 to 14, 17 to 25, 29, 30, and 36 to 40 have a value of 1, indicating that the flow packets for PSNs 16 to 30, 33 to 41, 45, 46, and 52 to 56 have been received by the receiver and acknowledged. The indicator bits at positions 15, 16, 26 to 28, and 31 to 35 have a value of 0, indicating that the flow packets for PSNs 31, 32, 42 to 44, and 47 to 51 have not yet been acknowledged, although the sender is not ready to decide whether those packets have been dropped or merely delayed.

The sender determines a metric that quantifies degree of OOO delivery, according to the state (710) of the OOO tracking window. FIG. 7 shows different approaches (700) that the sender can follow when determining the metric, as explained below. Based on the metric, the sender determines that the fast retransmission condition is satisfied and resends the flow packet with PSN 15, which is the earliest unacknowledged flow packet in the OOO tracking window. The sender can also resend other unacknowledged flow packets associated with "holes" in the OOO tracking window, as described below with reference to FIG. 8.

In example usage scenarios, using innovations described herein, a sender can accurately and quickly determine whether a packet is dropped or merely delayed, and resend a dropped packet. This can result in reliable delivery of packets that is faster overall. It can also help the sender avoid situations in which the sender stalls because an OOO tracking window is unable to move forward in time while the sender also cannot send new packets until the earliest packet in the OOO tracking window is acknowledged as received.

Instead, by quickly detecting potential packet drops and retransmitting dropped packets, the sender can keep the OOO tracking window moving forward in time and maintain high performance.

A. Example Techniques for Fast Retransmission of Packets.

FIG. 9 shows a generalized technique (900) for fast retransmission of packets in a network according to transport protocol that supports multi-path delivery and allows OOO delivery. A network interface device, as described with reference to FIG. 1 or otherwise, can perform the technique (900). The technique (900) shows operations from the perspective of a sender, which manages delivery of a packet flow according to a reliable transport protocol.

With reference to FIG. 9, the sender splits (910) data into multiple transport-layer flow packets of a flow. For example, the sender packetizes the data into multiple payloads. Each of the multiple transport-layer flow packets includes a header, one of the multiple payloads, and a checksum. The flow packets can be ordered by PSN in a packet sequence.

The sender then performs operations in a main processing loop. For example, in the main processing loop, the sender can selectively send flow packets to the receiver, react to feedback metadata from the receiver, and react to timeout events.

The sender checks (920) whether to send more flow packets. If so, the sender sends (922) at least some of the flow packets to a receiver. The sender sends the flow packets on multiple paths of a network. In some example implementations, the multiple paths of the network are symmetric. The multiple paths have identical length (in terms of the number of multiple hops between endpoints through network switches). Alternatively, the multiple paths of the network are asymmetric.

In any case, the sender can use some or all of the multiple paths to send the flow packets. For example, for each flow packet that it sends, the sender selects one of the multiple paths according to a round-robin strategy (rotation) or hashing function, then adjusts one or more bits of the flow packet to cause the flow packet to be sent over the selected path. The sender then continues the main processing loop.

In the main processing loop, the sender also checks (930) whether any feedback metadata has been received from the receiver. For example, the feedback metadata is received as one or more ACK packets. The feedback metadata can include ACK metadata and SACK metadata. For a given flow packet, the ACK metadata can indicate receipt, by the receiver, of the given flow packet, and the SACK metadata can indicate receipt, by the receiver, of any of the sent flow packets that is after the given flow packet in a packet sequence.

If the sender has received feedback metadata, the sender updates (932) the OOO tracking window based at least in part on the feedback metadata. ACK metadata can indicate the start of the updated OOO tracking window. Based on ACK metadata, the sender can move the OOO tracking window forward in time. SACK metadata can indicate which flow packets in the OOO tracking window have been received. Based on SACK metadata, the sender can update the OOO tracking window to indicate OOO receipt of flow packets.

The sender also determines (934) a metric that quantifies degree of OOO delivery. In doing so, the sender can use information (such as SACK metadata and/or the updated OOO tracking window) specifying flow packet(s) that have been acknowledged as received OOO by the receiver. Section V.B describes various examples of approaches to determine the metric that quantifies degree of OOO delivery. The sender can determine (934) the metric using one of these approaches or using another approach.

Based at least in part on the metric, the sender selectively resends, to the receiver, one or more unacknowledged flow packets among the sent flow packets. The unacknowledged flow packet(s) are indicated as not received in the OOO tracking window. For example, the sender checks (940) if the metric that quantifies degree of OOO delivery satisfies a threshold. The sender can do this by comparing the metric to a threshold. Section V.C describes various ways of setting and adjusting a threshold. If the metric satisfies the threshold, the sender identifies (942) one or more unacknowledged flow packets, from the updated OOO tracking window, to resend, and resends (944) the identified unacknowledged flow packet(s) to the receiver. Section V.D describes various approaches to identifying unacknowledged flow packet(s) to resend. The sender can identify the unacknowledged flow packet(s) to resend using one of these approaches or using another approach. Thus, responsive to determining that the metric satisfies the threshold, the sender resends identified unacknowledged flow packet(s) to the receiver. The sender then continues the main processing loop.

If the metric does not satisfy the threshold, the sender skips resending unacknowledged transport-layer flow packet(s) to the receiver. At this point, based on the feedback metadata and updated OOO tracking window, the sender can check (970) whether to continue operations for the packet flow. If all flow packets have been acknowledged as received, the sender can stop operations for the packet flow. Otherwise, the sender continues the main processing loop.

In the main processing loop, the sender also checks (950) whether a timeout condition has been satisfied. For example, the timeout condition is satisfied if a threshold amount of time has elapsed since a flow packet was transmitted without any acknowledgement of receipt of the flow packet by the receiver. In some example implementations, the timeout condition is a fallback condition. A timer for the timeout condition is set to a relatively long duration, so as to allow for OOO delivery and allow for retransmission of dropped packets according to a fast transmission strategy. If the timeout condition is satisfied, however, the sender identifies (952) one or more unacknowledged flow packets, from the updated OOO tracking window, to resend, and resends (954) the identified unacknowledged flow packet(s) to the receiver. The sender then continues the main processing loop.

B. Example Metrics that Quantify Degree of OOO Delivery.

As part of the fast retransmission mechanism, a sender determines a metric that quantifies degree of OOO delivery. To determine the metric, the sender can use information (such as SACK information) specifying transport-layer flow packet(s) that have been acknowledged as received OOO by the receiver. In general, the metric measures the extent to which flow packets have been successfully delivered OOO after a "missing" flow packet. If a sufficient count or range of flow packets have been acknowledged as received OOO after the missing packet, the missing packet is likely to have been dropped—not merely delayed.

Depending on implementation, the metric can be determined in different ways. FIG. 7 shows various approaches (700) to determining a metric quantifying degree of OOO delivery according to a reliable OOO transport protocol with fast retransmission of packets.

In one approach, the metric indicates a difference between the start of the updated OOO tracking window and a last OOO receipt event in the updated OOO tracking window. For example, as the metric, the sender simply determines the last acknowledged flow packet in the OOO tracking window as the last OOO receipt event. For this approach, the metric quantifies how much the OOO tracking window could advance if all holes in the OOO tracking window were filled. Conversely, the metric quantifies how much of the OOO tracking window is still available for new flow packets until the sender stalls. In the example of FIG. 7, according to this approach, the metric is 40, which is the last acknowledged flow packet according to received SACK information. If the metric is higher than a threshold difference, the sender can resend unacknowledged packets in the OOO tracking window.

In other approaches, the metric indicates a count of OOO receipt events in the updated OOO tracking window. For example, in a second approach, the metric indicates the count of consecutive acknowledged flow packets, if any, at the start of the updated OOO tracking window. The sender counts, in the updated OOO tracking window, consecutive acknowledged flow packets, among the sent flow packets, at the start of the updated OOO tracking window, before reaching the first "hole" inside the OOO tracking window. In the example of FIG. 7, according to the second approach, the metric is 15, which is the count of consecutive acknowledged flow packets at the start of the OOO tracking window, before the "hole" at position 15. If the count of consecutive acknowledged flow packets is higher than a threshold count, the sender can resend unacknowledged packets in the OOO tracking window.

As another example, in a third approach, the metric indicates a total count of acknowledged flow packets in the updated OOO tracking window. The sender counts, in the updated OOO tracking window, any acknowledged flow packets among the sent flow packets. In the example of FIG. 7, according to the third approach, the metric is 30, which is count of acknowledged flow packets in the OOO tracking window. If the count of acknowledged flow packets in the updated OOO tracking window is higher than a threshold count, the sender can resend unacknowledged packets in the OOO tracking window.

Alternatively, the sender uses another approach to determine a metric that quantifies degree of OOO delivery.

C. Example Thresholds for Fast Retransmission.

After determining the metric that quantifies degree of OOO delivery, the sender can compare the metric to a threshold in order to determine when to trigger fast retransmission of unacknowledged flow packet(s) in the OOO tracking window. With fast retransmission, the sender can accelerate the process of filling holes in the OOO tracking window and help the OOO tracking window advance in time. Setting the value of the threshold for the fast retransmission mechanism can have a significant impact on performance.

In general, the value of the threshold can be set to balance (a) the risk of unnecessary, redundant packet transmission versus (b) reduction in overall latency for delivery of flow packets and reduction in likelihood of the sender stalling due to the OOO tracking window not moving. If the threshold is low, packets of a flow may be delivered faster overall, and there is less risk that the OOO tracking window will cause the sender to stall, but some flow packets may be unnecessarily retransmitted when the flow packets were merely delayed, not dropped. On the other hand, if the threshold is high, delivery of packets of a flow may take more time, and there is higher risk that the OOO tracking window will cause the sender to stall, but delayed flow packets are given more time to arrive OOO, so that fewer flow packets are unnecessarily retransmitted. The threshold depends on how the metric is determined. For example, if the metric indicates a difference between the start of the updated OOO tracking window and a last OOO receipt event in the updated OOO tracking window, the threshold is a threshold difference. As another example, if the metric indicates a count of OOO receipt events in the updated OOO tracking window, the threshold is a threshold count.

In some example implementations, the value of the threshold is tuned for a specific network. A given network may have a known topology, predictable path latencies, and bound latency variation across its multiple paths and within a path. In this context, the threshold can be tuned for the metric that quantifies degree of OOO delivery. For typical OOO delivery patterns and behavior, the metric is below the threshold. When the metric that quantifies degree of OOO delivery is above the threshold, however, the sender determines that packet loss has likely occurred. The threshold can be tuned for the specific network using various factors.

For example, the threshold can depend on the count of multiple paths in a network. When flow packets are delivered using multi-path delivery over multiple paths of a network, the flow packets are distributed between the paths. The threshold can initially be set to be double or triple the count of paths in the network. In other words, the threshold accounts for two or three flow packets (at least on average) being sent over each path before the threshold is reached.

As another example, the threshold can be tuned depending on observed past behavior of the network in transmitting previous packet flows. The results of delivering previous packet flows may show that a next in-order flow packet has actually been dropped (and not merely delayed): 60% of the time when the metric has reached a first value, 70% of the time when the metric has reached a second value higher than the first value, 80% of the time when the metric has reached a third value higher than the second value, and so on. The sender can select the first value, the second value, the third value, or another value as the threshold, thereby tuning the value of the threshold to balance various competing performance goals, as described above.

After the threshold is set, the threshold does not change unless there is a change to equipment of the network or typical workloads on the network. Alternatively, the sender can dynamically adjust the threshold based on various factors. For example, the sender can dynamically adjust the threshold based on the location of a last OOO receipt event in the updated OOO tracking window. The sender can lower the threshold if the last OOO receipt event is closer to the end of the updated OOO tracking window, to make it more likely for the fast transmission mechanism to be triggered. Conversely, the sender can raise the threshold if the last OOO receipt event is closer to the start of the updated OOO tracking window, to make it less likely for the fast transmission mechanism to be triggered. Or, as another example, the sender can dynamically adjust the threshold based on the current condition of the network. The sender can lower the threshold if the network is not busy, under the assumption that retransmissions are less likely to cause delay in delivery of other flow packets. Conversely, the sender can raise the threshold if the network is busy, under the assumption that retransmissions are more likely to cause delay in delivery of other flow packets. Or, as another example, the sender can dynamically adjust the threshold based on the current workload of the sender. The sender can lower the threshold if the sender does not have many flow packets to send, under the assumption that retransmissions are less likely to cause delay in delivery of other flow packets. Conversely, the sender can raise the threshold if the sender has many flow packets to send, under the assumption that retransmissions are more likely to cause delay in delivery of other flow packets. Alternatively, the sender can dynamically adjust the threshold based on other and/or additional factors.

D. Example Approaches for Identifying Packets to Resend.

Figure 8:
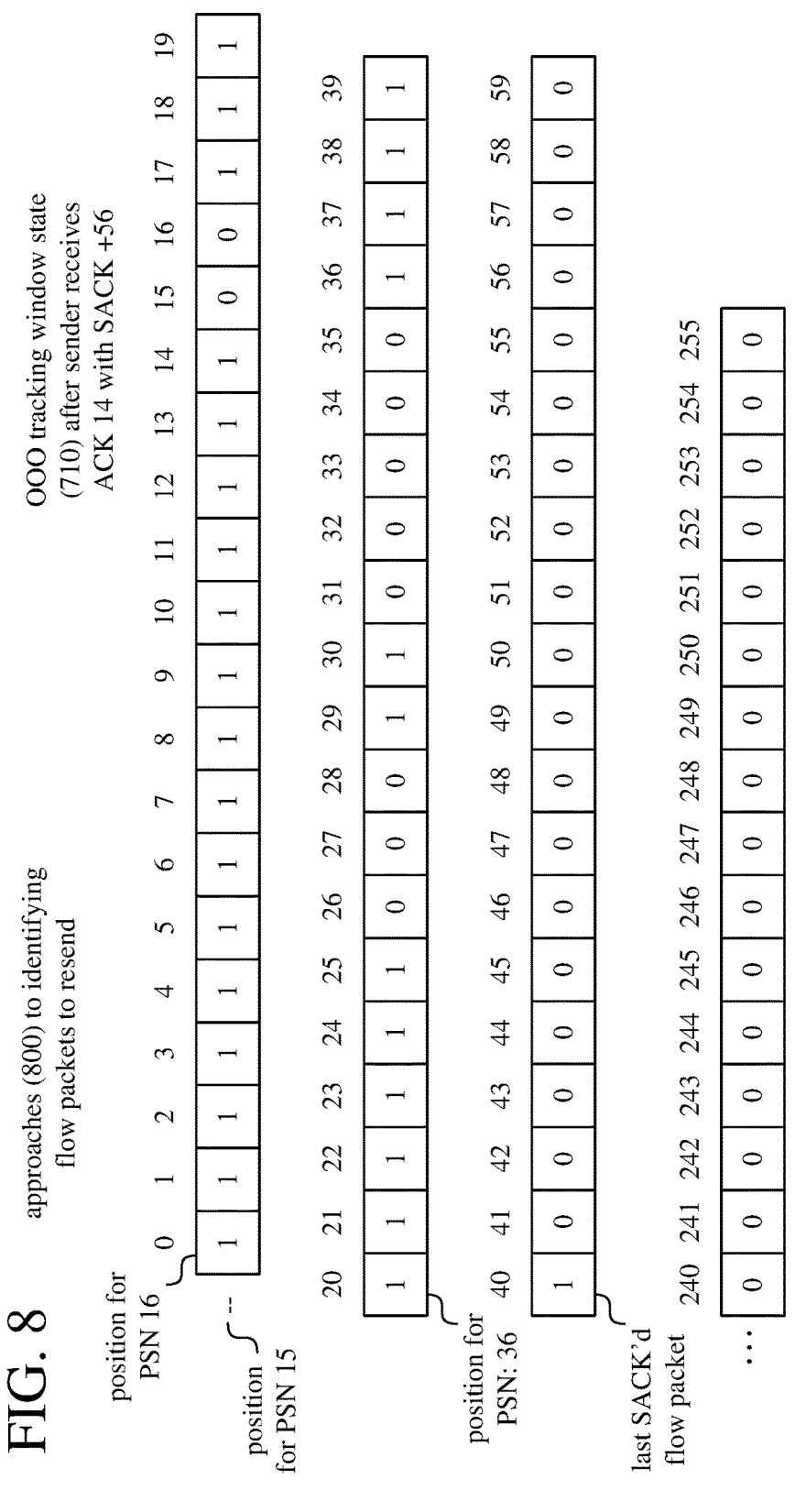
FIG. 8 is a diagram that illustrates different approaches to identifying unacknowledged flow packets for retransmission according to a reliable OOO transport protocol with fast retransmission of packets.

When the fast retransmission mechanism is triggered, the sender identifies one or more unacknowledged flow packets in the OOO tracking window to resend. FIG. 8 shows various approaches (800) to identifying unacknowledged flow packet(s) for retransmission according to a reliable OOO transport protocol with fast retransmission of packets. The retransmission approach that is used can depend on the type of network, expected workload, and/or other factors.

For example, for one approach, the sender identifies unacknowledged flow packet(s) for retransmission by identifying, among the sent multiple flow packets, an oldest unacknowledged flow packet. In other words, the sender identifies the next in-order flow packet that defines the start of the OOO tracking window. In FIG. 8, the flow packet with PSN 15 is identified according to the first approach.

Or, for a second approach, the sender identifies unacknowledged flow packet(s) for retransmission by identifying, among the sent flow packets, the oldest unacknowledged flow packet and any consecutive unacknowledged flow packets in the updated OOO tracking window after the oldest unacknowledged flow packet. In other words, the sender identifies the next in-order flow packet that defines the start of the OOO tracking window and any consecutive unacknowledged flow packets that follow the next in-order flow packet, up to the first "hole" inside the OOO tracking window. In FIG. 8, the flow packet with PSN 15 is identified according to the second approach—there are no unacknowledged flow packets immediately following the flow packet with PSN 15.

Or, for a third approach, the sender identifies unacknowledged flow packet(s) for retransmission by identifying, among the sent flow packets, every unacknowledged flow packet in the updated OOO tracking window that is before a last acknowledged flow packet in the updated OOO tracking window. In other words, the sender identifies all unacknowledged flow packets (all "holes") before the last acknowledged flow packet in the OOO tracking window. In FIG. 8, the flow packets with PSNs 15, 31, 32, 42-44, and 47-51 are identified according to the third approach.

Or, for a fourth approach, the sender identifies unacknowledged flow packet(s) for retransmission by identifying, among the sent flow packets, every unacknowledged flow packet that is before a last acknowledged flow packet in the updated OOO tracking window, up to a cutoff in the updated OOO tracking window. In other words, the sender identifies all unacknowledged flow packets (all "holes") before the last acknowledged flow packet in the OOO tracking window, up to the cutoff. The cutoff can be a cutoff count or cutoff percentage such as 30%. In this way, older unacknowledged flow packets can be retransmitted while providing additional time for more recently sent unacknowledged flow packets to be delivered OOO. In FIG. 8, the flow packets with PSNs 15, 31, and 32 are identified according to the fourth approach.

Alternatively, the sender identifies unacknowledged flow packet(s) for retransmission in some other way.

In some example implementations, the sender uses a single approach to identify unacknowledged flow packet(s) for retransmission. Alternatively, the sender can adjust the approach it uses to identify unacknowledged flow packet(s) for retransmission. For example, the sender can use a more aggressive approach (retransmitting more unacknowledged flow packets) if the last acknowledged flow packet is close to the end of the OOO tracking window, with the goal of causing the OOO tracking window to more forward more in time.

E. Technical Advantages.

With innovations described herein, a reliable OOO transport protocol includes a mechanism for fast retransmission of packets. In example usage scenarios, with the fast retransmission mechanism, a sender can quickly and accurately determine whether a packet is dropped or merely delayed, and quickly resend a dropped packet. The innovations provide several technical benefits, including the following.

First, because packets of a flow are delivered using multi-path delivery, available network bandwidth is more consistently and evenly used, compared to approaches in which packets of a flow are delivered using single-path delivery.

Second, with the fast retransmission mechanism, reliable delivery of packets for a flow can be faster overall, compared to approaches with slower retransmission decisions such as timeout conditions.

Third, the fast retransmission mechanism can help the sender avoid situations in which the sender stalls—is unable to send other packets-until a dropped packet is retransmitted and acknowledged as received.

Fourth, for the fast transmission mechanism, a metric that quantifies degree of OOO delivery and corresponding threshold can be used to effectively distinguish packet drops from packet delays, even when there are bursts of packet delays and/or packet drops.

Fifth, the fast retransmission mechanism is implemented as part of a transport protocol, which supports transmission of packets on paths with multiple hops and supports transmission of packets on paths implemented with different types of data link technology. In contrast to approaches that provide for retransmission of packets on a path with a single hop (e.g., for wireless transmission), approaches described herein work for paths with multiple hops per path. Approaches that provide for retransmission of packets at the link layer (for delivery over a single-hop path) typically attempt to mitigate erroneous transmissions and transparently recover from them without affecting higher-level functions of the transport layer, such as flow control. In contrast, approaches described herein can work for different types of data links and can be integrated into higher-level functions of a transport protocol, even when packets of a flow are delivered using multiple-path delivery over multi-hop paths of a network.

F. Alternatives for Fast Retransmission Mechanism.

In many examples described herein, a fast retransmission mechanism uses a metric that quantifies degree of OOO delivery. Alternatively, a fast retransmission can also use other information such as latency of flow packets. For example, a sender can track round trip time ("RTT") for a flow packet as the difference between the time the flow packet was sent and the time an ACK packet for the flow packet was received. The sender can track typical RTT for the transport-layer packets of a flow or for transport-layer packets of multiple flows. When deciding whether a given unacknowledged flow packet has been dropped or merely delayed, in addition to considering the metric that quantifies degree of OOO delivery, the sender can consider whether elapsed time since the given unacknowledged flow packet was sent exceeds a threshold time. The threshold time can be the typical RTT, double the typical RTT, triple the typical RTT, or some other amount of time that is effective to distinguish a packet drop from a packet delay.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system, a method of managing delivery of a packet flow according to a reliable transport protocol, the method comprising:

at a sender, splitting data into multiple transport-layer flow packets of a flow;

sending, from the sender to a receiver on multiple paths of a network, at least some of the multiple transport-layer flow packets;

receiving, at the sender from the receiver, feedback metadata;

at the sender, updating an out-of-order ("OOO") tracking window based at least in part on the feedback metadata;

at the sender, determining a metric that quantifies degree of OOO delivery, wherein the metric measures a count or range of transport-layer flow packets in the OOO tracking window that have been acknowledged as received OOO after a missing transport-layer flow packet; and based at least in part on the metric, selectively resending, from the sender to the receiver, one or more unacknowledged transport-layer flow packets, according to the updated OOO tracking window, among the sent transport-layer flow packets.

2. The method of claim 1, wherein the splitting the data into multiple transport-layer flow packets includes packetizing the data into multiple payloads, and wherein each of the multiple transport-layer flow packets includes a header, one of the multiple payloads, and a checksum.

3. The method of claim 1, wherein the multiple paths have identical length in terms of count of multiple hops, and wherein the sending the at least some of the multiple transport-layer flow packets uses all of the multiple paths.

4. The method of claim 3, further comprising, for each transport-layer flow packet among the at least some of the multiple transport-layer flow packets:

selecting one of the multiple paths according to a round-robin strategy or hashing function; and adjusting one or more bits of the transport-layer flow packet to cause the transport-layer flow packet to be sent over the selected path.

5. The method of claim 1, wherein the feedback metadata is received as one or more acknowledgement packets.

6. The method of claim 1, wherein the multiple transport-layer flow packets are ordered by packet sequence number in a packet sequence, wherein the feedback metadata includes acknowledgement ("ACK") metadata and selective ACK metadata, and wherein, for a given transport-layer flow packet among the at least some of the multiple transport-layer flow packets:

the ACK metadata indicates receipt, by the receiver, of the given transport-layer flow packet;

the ACK metadata indicates a start of the updated OOO tracking window; and the selective ACK metadata indicates receipt, by the receiver, of any of the sent transport-layer flow packets that is after the given transport-layer flow packet in the packet sequence.

7. The method of claim 1, wherein the determining the metric that quantifies degree of OOO delivery uses information specifying one or more transport-layer flow packets, among the sent transport-layer flow packets, that have been acknowledged as received OOO by the receiver.

8. The method of claim 7, wherein the metric indicates a difference between a start of the updated OOO tracking window and a last OOO receipt event in the updated OOO tracking window.

9. The method of claim 7, wherein the metric indicates a count of OOO receipt events in the updated OOO tracking window.

10. The method of claim 9, wherein the determining the metric includes:

counting, in the updated OOO tracking window, any acknowledged transport-layer flow packets among the sent transport-layer flow packets.

11. The method of claim 9, wherein the determining the metric includes:

counting, in the updated OOO tracking window, consecutive acknowledged transport-layer flow packets, among the sent transport-layer flow packets, at the start of the updated 000 tracking window.

12. The method of claim 1, wherein the selectively resending includes:

comparing the metric to a threshold.

13. The method of claim 12, wherein the threshold depends on one or more of:

count of the multiple paths; and past behavior of the network.

14. The method of claim 12, further comprising adjusting the threshold based on one or more of:

location of a last OOO receipt event in the updated OOO tracking window;

a current condition of the network; and current workload of the sender.

15. The method of claim 12, wherein the selectively resending further includes:

determining that the metric satisfies the threshold and, responsive to the determining that the metric satisfies the threshold, resending the one or more unacknowledged transport-layer flow packets from the sender to the receiver; or determining that the metric does not satisfy the threshold and, responsive to the determining that the metric does not satisfy the threshold, skipping the resending the one or more unacknowledged transport-layer flow packets from the sender to the receiver.

16. The method of claim 1, wherein the selectively resending is also based at least in part on a measure of latency for an oldest unacknowledged transport-layer flow packet among the sent multiple transport-layer flow packets.

17. The method of claim 1, wherein the selectively resending includes identifying the one or more unacknowledged transport-layer flow packets by:

identifying, among the sent multiple transport-layer flow packets, an oldest unacknowledged transport-layer flow packet; or identifying, among the sent transport-layer flow packets, the oldest unacknowledged transport-layer flow packet and any consecutive unacknowledged transport-layer flow packets in the updated OOO tracking window after the oldest unacknowledged transport-layer flow packet.

18. The method of claim 1, wherein the selectively resending includes identifying the one or more unacknowledged transport-layer flow packets by:

identifying, among the sent transport-layer flow packets, every unacknowledged transport-layer flow packet in the updated OOO tracking window before a last acknowledged transport-layer flow packet in the updated OOO tracking window; or identifying, among the sent transport-layer flow packets, every unacknowledged transport-layer flow packet before a last acknowledged transport-layer flow packet in the updated OOO tracking window, up to a cutoff in the updated OOO tracking window.

19. One or more non-transitory computer-readable media having stored thereon computer-executable instructions for causing one or more processing units, when programmed thereby, to perform operations to manage delivery of a packet flow according to a reliable transport protocol, the operations comprising:

at a sender, splitting data into multiple transport-layer flow packets of a flow;

sending, from the sender to a receiver on multiple paths of a network, at least some of the multiple transport-layer flow packets;

receiving, at the sender from the receiver, feedback metadata;

at the sender, updating an out-of-order ("OOO") tracking window based at least in part on the feedback metadata;

at the sender, determining a metric that quantifies degree of OOO delivery, wherein the metric measures a count or range of transport-layer flow packets in the OOO tracking window that have been acknowledged as received OOO after a missing transport-layer flow packet; and based at least in part on the metric, selectively resending, from the sender to the receiver, one or more unacknowledged transport-layer flow packets, according to the updated OOO tracking window, among the at least some of the multiple transport-layer flow packets.

20. A network interface device configured to perform operations to manage delivery of a packet flow according to a reliable transport protocol, the operations comprising:

at a sender, splitting data into multiple transport-layer flow packets of a flow;

sending, from the sender to a receiver on multiple paths of a network, at least some of the multiple transport-layer flow packets;

receiving, at the sender from the receiver, feedback metadata;

at the sender, updating an out-of-order ("OOO") tracking window based at least in part on the feedback metadata;

at the sender, determining a metric that quantifies degree of OOO delivery, wherein the metric measures a count or range of transport-layer flow packets in the OOO tracking window that have been acknowledged as received OOO after a missing transport-layer flow packet; and based at least in part on the metric, selectively resending, from the sender to the receiver, one or more unacknowledged transport-layer flow packets, according to the updated OOO tracking window, among the at least some of the multiple transport-layer flow packets.

\* \* \* \* \*